United States Patent [19]

Hirota

[11] Patent Number: 5,132,788
[45] Date of Patent: Jul. 21, 1992

[54] IMAGE PROCESSING APPARATUS FOR PROCESSING RESPECTIVE IMAGE DATA OBTAINED BY READING AN OUTPUTTING IMAGE SIGNAL CORRESPONDING TO PIXELS FORMING THE ORIGINAL IMAGE

[75] Inventor: Yoshihiko Hirota, Osaka, Japan

[73] Assignee: Minolta Camera Kabushiki Kaisha, Osaka, Japan

[21] Appl. No.: 483,817

[22] Filed: Feb. 23, 1990

[30] Foreign Application Priority Data

Feb. 25, 1989 [JP] Japan ................................. 1-44054
Feb. 25, 1989 [JP] Japan ................................. 1-44055
Feb. 25, 1989 [JP] Japan ................................. 1-44056
Feb. 25, 1989 [JP] Japan ................................. 1-44057
Feb. 25, 1989 [JP] Japan ................................. 1-44058

[51] Int. Cl.$^5$ ............................ H04N 1/46; G03F 3/08
[52] U.S. Cl. ........................................ 358/75; 358/80
[58] Field of Search ................. 358/75, 76, 78, 79, 358/80, 54

[56] References Cited

U.S. PATENT DOCUMENTS

| | | | |
|---|---|---|---|
| 4,841,362 | 6/1989 | Urabe et al. | 358/75 |
| 4,845,550 | 7/1989 | Urabe et al. | 358/75 |
| 4,975,769 | 12/1990 | Aizu et al. | 358/75 |
| 4,980,758 | 12/1990 | Matsunawa et al. | 358/80 |
| 4,989,079 | 1/1991 | Ito | 358/80 |
| 4,989,080 | 1/1991 | Ito | 358/80 |

Primary Examiner—Stephen Brinich
Attorney, Agent, or Firm—Burns, Doane, Swecker & Mathis

[57] ABSTRACT

An image processing apparatus reads an original image by dividing it into pixels, processes respective image data obtained by the reading, and outputs an image signal corresponding to each pixel. The apparatus includes a selector for selecting minimum image data from image data of additive three primary colors obtained by reading a color image; a multiplying device for multiplying the minimum image data by either an under-color removal coefficient data or a black paint coefficient data supplied thereto and outputting under-color image data or black paint image data. An under-color removal calculator receives the image data of the additive three primary colors and the image data outputted from the multiplying device and generates under-color removal image data corresponding to the image data of the respective additive colors based on the under-color image data. A color correction masking device for receives the under-color removal image data from the under-color removal calculator and generates image data of subtractive colors based on masking coefficient data according to the respective additive colors. An image data selector receives the image data outputted from the multiplying device, the image data outputted from the color correction masking device, and one of the image data of the additive three primary colors so as to selectively output the respective image data.

8 Claims, 26 Drawing Sheets

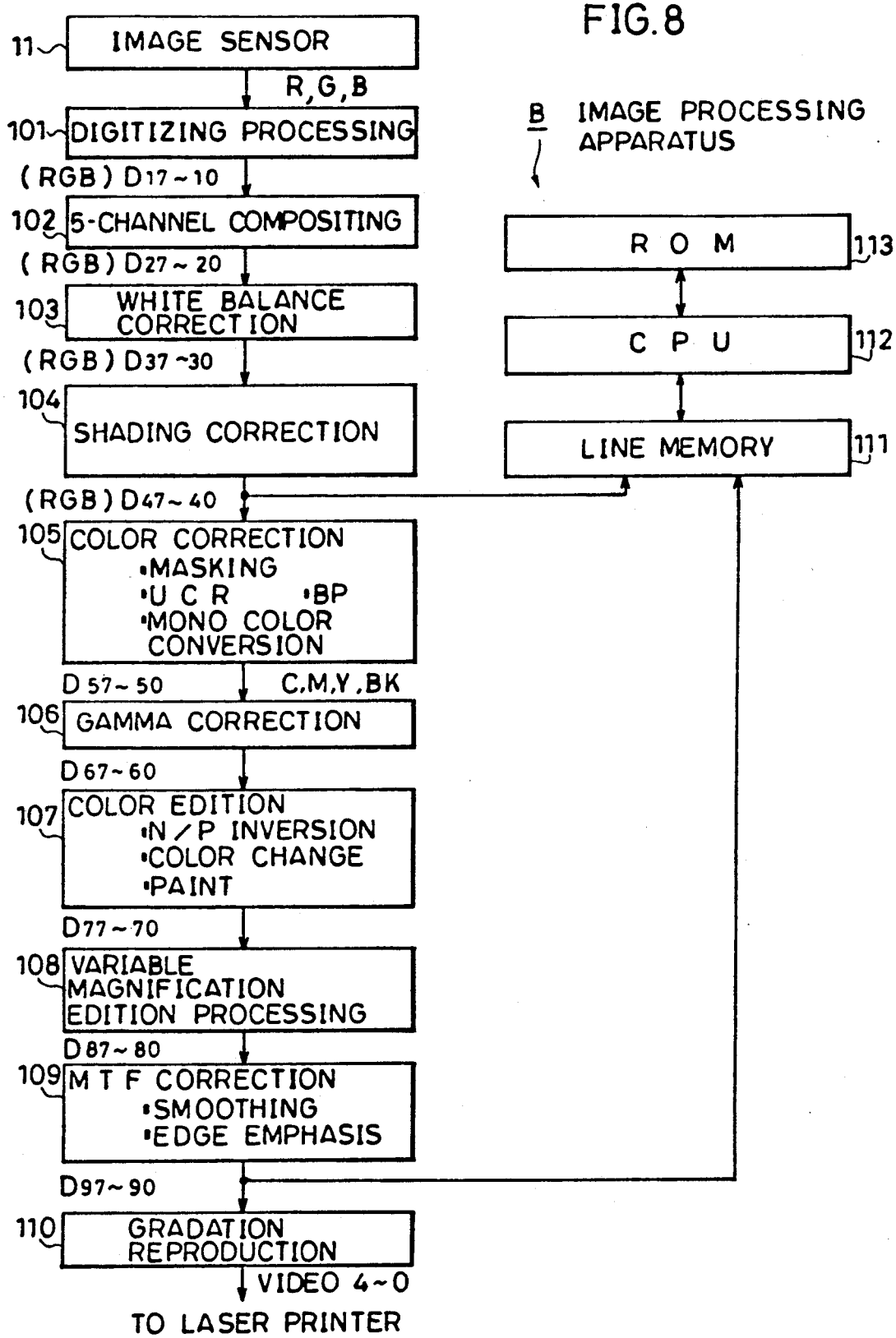

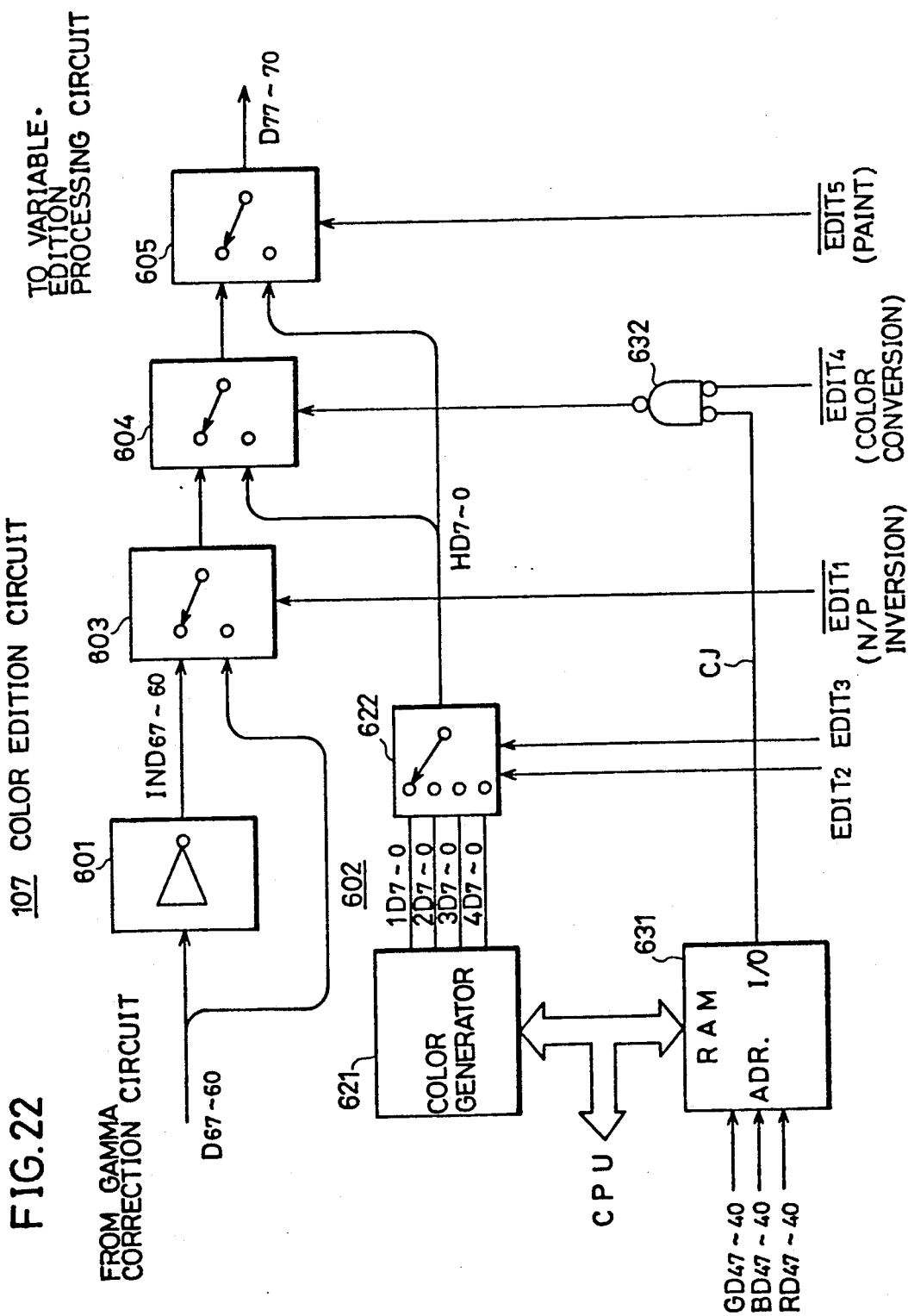

IMAGE PROCESSING APPARATUS FOR PROCESSING RESPECTIVE IMAGE DATA OBTAINED BY READING AN OUTPUTTING IMAGE SIGNAL CORRESPONDING TO PIXELS FORMING THE ORIGINAL IMAGE

BACKGROUND OF THE INVENTION

1. Field of the Invention

The present invention relates to image processing apparatus and particularly to image processing apparatus which provides an image signal for forming a hard copy image.

2. Description of the Related Art

In general, in the case of forming a full color hard copy image, the colors of an original image are reproduced in a process where color materials (such as toners or ink) of subtractive three colors, yellow (Y), magenta (M) and cyan (C) are caused to successively adhere on copy paper. The amounts of adhesion of the respective color materials are controlled by image signals.

If a color original image is decomposed into additive three primary colors, red (R), green (G) and blue (B), image signals corresponding to the respective colors of the color materials are produced from image data of the respective additive colors by sequential image processing (color correction processing) including black paint (BP) processing, under-color removal (UCR) processing and color correction masking processing.

As for the color materials, it is desirable for the color material of yellow (Y) to present a spectral characteristic (wavelength absorbing characteristic) absorbing only a blue (B) region, for the color material of magenta (M) to present a spectral characteristic absorbing only a green (G) region, and for the color material of cyan (C) to present a spectral characteristic absorbing only a red (R) region. However, in reality, the color materials do not exhibit such ideal spectral characteristics and unnecessary spectral absorption called sub absorption exists.

FIG. 25 is a graph showing general spectral characteristics of toners of Y, C, M used in color image formation in an electrophotographic process. The abscissa represents a wavelength of incident light and the ordinate represents reflectance corresponding to light absorption.

As shown in the figure, the Y toner exhibits a good spectral characteristic with high color purity but the C toner causes sub absorption in the G region and a little sub absorption in the B region. The M toner causes sub absorption in the B region.

Consequently, if overlap printing is effected by using those toners, muddiness occurs in the reproduced colors.

For example, if red (R) color is to be reproduced by mixing the M toner and Y toner, the Y component (the component absorbing the B region) in the M toner would be represented excessively or a yellowish muddy red color would be reproduced. Therefore, if the amount of adhesion of Y toner to be mixed with the M toner is decreased, an R region with high purity can be reproduced.

Such processing of adjusting a mixing ratio of image data corresponding to the respective colors of the toners is called color correction masking processing and this processing is indispensable for hard copy image formation.

In the case of color reproduction by successive overlapping of the color materials of three colors, it is difficult to reproduce pure black color and particularly in letter or fine line images, color deviation would often occur, causing the image quality to be lowered. Therefore, overlap printing using color materials of four colors including a black (Bk) toner in addition to Y, M, C toners is effected in normal color image formation.

The processing of producing image data of Bk from image data of the respective colors Y, M, C is called black paint (BP) processing, and in formation of the Bk image data, under-color removal (UCR) processing is applied to subtract a component compensated for Bk from the image data of the Y, M, C colors. By using the BP processing and UCR processing, it becomes possible to form an image of a high quality with excellent registration (mixing condition of colors) and the amount of consumption of the color materials of Y, M, C can be reduced.

The sequential color correction processing including the BP processing, UCR processing and color correction masking processing can be performed by calculation in a central processing unit (CPU). However, in an image reading apparatus where rapid processing is required for operation from reading of an original image to transmission of an image signal, hardware dedicated to color correction processing is used.

FIG. 26 is a block diagram of a color correction circuit 99 comprising a conventional image reading apparatus.

The color correction circuit 99 comprises: minimum image data selecting means 91 for selecting minimum image data Dmin out of the image data GT, BD, RD of the three additive colors; a multiplying device 92 for multiplying under-color removal coefficient data U by the minimum image data Dmin, thereby outputting under-color image data UD; a multiplying device 93 for multiplying black paint coefficient data K by the minimum image data Dmin, thereby outputting black paint image data BkD; UCR calculating means 94 for generating under-color removal image data Dg, Db, Dr corresponding to the respective additive color image data GD, BD, RD based on the under-color image data UD; selecting means 95 for selecting one of the under-color removal image data Dg, Db, Dr; and color correction masking means 96 for generating image data Yd, Md, Cd of subtractive colors based on masking coefficient data al, cl corresponding to the respective additive colors.

For example, if the image reading apparatus provides an image signal corresponding to the subtractive color Y, selection circuits 95g, 95b, 95r of the selecting means 95 select under-color removal image data Gd, Dr, Db as shown by the arrows in the figure. Thus, as a result of multiplication and addition operations in the color correction multiplying means 96, the generated image data YD is al·Dg+bl Dr+cl·Db.

The above described color correction circuit 99, where BP processing, UCR processing and color correction masking processing are performed by calculating means such as multiplying devices or adders, is capable of high-speed processing and has a low cost since a large-capacity table index ROM (Read Only Memory) is not required although complicated function calculation processing cannot be performed compared with a circuit using a table index system for color correction masking.

For purposes of making image reading apparatus compact and reducing the manufacturing costs, there are tendencies toward high degrees of integration in not only the color correction circuit but also other electric circuits in the apparatus.

To realize an integrated circuit, it is necessary to simplify the circuit configuration although it is also important to provide discrete circuits. For example, in the case of gate array which is advantageous for integration of digital circuits, it is important to perform operation processing with a smaller number of functional blocks in order to enhance the integration degree.

In some cases, a so-called monocolor image obtained by reproducing a full color original image by a single color is suited dependent on applications for which the image to be formed is used.

In view of such cases, many conventional image processing apparatus use a black paint image signal generated by the BP processing and output the same in substitution for a monocolor image signal. In addition, as described for example in Japanese Patent Laying-Open No. 62-116958, a monocolor image signal is formed by compositing image data of respective subtractive three colors Y, M, C formed by color correction masking processing.

The black paint image signal is primarily an auxiliary signal formed to enhance reproducibility of pure black color and the registration (color mixing degree) in reproduction of letter or line images and to adjust the tone of a high density portion. In addition, the black paint image signal has difficulty in adjustment with the color materials of subtractive three colors if a Bk color material is used for the entire density region of an original image, and fouling with the Bk color material is liable to occur especially in a bright portion. Consequently, the black paint image signal is generated based on a skelton black method where the mixing ratio of the Bk color material increases according to increase of the density.

Thus, in the conventional apparatus using the black paint image signal in substitution for a monocolor image signal, a monocolor image of high quality cannot be formed with good balance over the entire density region.

If a monocolor image data is to be composited from image data of the three subtractive colors, the quality of the monocolor image can be improved by appropriately setting the mixing ratio of the three colors. For that purpose, it is necessary to provide a high-speed and large-capacity ROM which stores composite data for all of values of the image data of the three colors. Generally, the color correction processing means is formed by four-operation means including combination of logical elements and if a ROM having a quality different from the logical elements is used, it is not possible to integrally form the dedicated hardware for color correction processing, making the entire structure of the image processing apparatus complicated.

An image processing apparatus incorporated in an image forming apparatus (such as a digital copying apparatus, a facsimile, and various printers) for forming a hard copy image of an original image on an original or a CRT display, image processing called density correction processing is performed with respect to image data corresponding to respective pixels of the original image so that the hard copy image of a desired density can be formed.

Density correction in a conventional image processing apparatus is carried out by a table index system (lookup table system) as described for example in Japanese Patent Publication No. 60-23541.

More specifically, density correction image data is stored in advance in a ROM, and density correction image data of an address designated by bit data corresponding to a designated density and by the image data before correction is outputted as an image signal.

According to the table index system as in the prior art, an arbitrary correction pattern can be set according to the content of the density correction image data prepared in the ROM.

However, in order to attain fine adjustment close to stepless adjustment by increasing the number of density inclinations to be designated, namely, the number of steps of density designation such as degrees light→slightly light→normal→slightly thick→thick, it is necessary to provide a large-capacity ROM, causing increase in the size of the apparatus.

In addition, a high-speed ROM integrated circuit device, with access time of 50 nsec or less is expensive at present and the manufacturing cost of the device comes to be high.

On the other hand, according to the table index system, an arbitrary correction characteristic can be set according to the content of density correction image data prepared in a ROM. For example, if a correction characteristic is set to increase or decrease a value only with respect to image data of a prescribed density or more, no fouling occurs in the background area (white area) of the original image even if the density is increased.

However, once the content to be stored is set, output image data (density correction image data) is definitely defined with respect to input image data and if the background color of the original image has a density higher than a set sensity, that is, if the original image is formed on colored (other than white) background such as blue print paper or newspaper, the density of the background color is also corrected together with the density of the image, causing an unclear image of a deteriorated contrast between the background color and the image.

Thus, in density correction according to the table index system, contrast adjustment between the background area and the image area and density adjustment of the image area cannot be performed independently.

Therefore, it may be considered to use a method of correction of image data (background correction) to attain a good contrast with the background color by increasing the intensity of light of a light source illuminating an original to a value larger than that for white original according to the density of the background area, or adjusting a reference potential for A/D conversion in quantization of a photoelectric conversion signal obtained by reading the original. However, such method involves analog control and a stable precision cannot be obtained. In addition, the dynamic range of the image data is changed due to the correction, making it difficult to set a correspondence with density correction by image processing (digital signal processing).

In addition, in the conventional image processing apparatus, density correction processing for forming a hard copy image of a desired density is performed after image data corresponding to the respective colors of color materials are converted to image data corresponding to a color edited image.

Consequently, the density of the image formed is controlled indiscriminately and the density of a designated area for example to be painted out is also changed together with other areas.

SUMMARY OF THE INVENTION

An object of the present invention is to improve a quality of an image in an image processing apparatus.

Another object of the present invention is to reduce a size of an image processing apparatus.

Still another object of the present invention is to form a monocolor image of a high quality in an image processing apparatus.

A further object of the present invention is to perform density correction with multiple steps at high speed in an image processing apparatus.

A further object of the present invention is to form a clear image with good contrast independent of a background color density in an image processing apparatus.

A still further object of the present invention is to enhance variety of color edition functions in an image processing apparatus.

In order to accomplish the above described objects, an image processing apparatus according to a first aspect of the present invention is an image processing apparatus which reads an original image by dividing the image into pixels and processes respective image data thus read to output an image signal corresponding to each pixel, and this image processing apparatus includes: a selector for selecting minimum image data from the image data of additive three primary colors obtained by reading a color image; a multiplying device for multiplying the minimum image data by either under-color removal coefficient data or black paint coefficient data supplied to the device, thereby outputting under-color image data or black paint image data; an under-color removal calculator for receiving the image data of the additive three primary colors and the image data outputted from the multiplying device and generating under-color removal image data corresponding to the image data of the additive colors based on the under-color image data; a color correction masking device for receiving the under-color removal image data from the under-color removal calculator and generating image data of subtractive colors based on masking coefficient data according to the respective additive colors; and an image data selector for receiving the image data outputted from the multiplying device and the image data outputted from the color correction masking device, and selectively outputting the image data of the subtractive colors outputted from the color correction masking device when the under-color removal correction data is supplied to the multiplying device, and the black paint image data outputted from the multiplying device when the black paint coefficient data is supplied to the multiplying device.

The image processing apparatus thus constructed can be small-sized since the number of multiplying devices and selectors can be reduced compared with a conventional color correction circuit.

In order to accomplish the above described objects, an image processing apparatus according to a second aspect of the present invention is an image processing apparatus which reads an original image by dividing it into pixels, processes respective image data thus read and outputs an image signal corresponding to each pixel, and this image processing apparatus includes: a selector for selecting minimum image data from the image data of respective additive three primary colors obtained by reading a color image; a multiplying device for multiplying the minimum image data by either under-color removal coefficient data or black paint coefficient data supplied thereto and outputting under-color image data or black image data; an under-color removal calculator for receiving the image data of the additive three primary colors and the image data outputted from the multiplying device and generating under-color removal image data corresponding to the image data of the respective additive colors based on the under-color image data; a color correction masking device for receiving the under-color removal image data from the under-color removal calculator and generating image data of subtractive colors based on masking coefficient data according to the respective additive colors; and an image data selector constructed to receive the image data outputted from the multiplying device, the image data outputted from the color correction masking device and the image data of one of the additive three primary colors, and selectively outputting the respective image data.

The image processing apparatus thus constructed selectively outputs the respective image data and consequently it becomes possible to form a desired image of a high quality.

In order to accomplish the above described objects, an image processing apparatus according to a third aspect of the invention is an image processing apparatus which reads an original image by deviding it into pixels, processes respective image data read and outputs an image signal corresponding to each pixel and this image processing apparatus includes: a multiplying device for multiplying density coefficient data designated for each original image by the image data, thereby outputting correction data; and a density correction calculator for adding the correction data outputted from the multiplying device and the above mentioned image data, thereby outputting density correction image data.

The image processing apparatus thus constructed is capable of correcting densities with multiple steps at high speed without using a ROM of a large capacity.

In order to accomplish the above described objects, an image processing apparatus according to a fourth aspect of the invention is an image processing apparatus which reads an original image by dividing it into pixels, processes respective image data read and outputs an image signal corresponding to each pixel and this image processing apparatus includes: a subtracter for subtracting image data based on background color data designated for each original image; a multiplying device for multiplying the image data obtained by subtraction of the subtracter by density coefficient data designated for each original image, thereby outputting correction data; and a density correction calculator for adding the correction data outputted from the multiplying device and the above mentioned image data, thereby outputting density correction image data.

The image processing apparatus thus constructed is capable of generating an image signal for forming a clear image with good contrast independent of a background color density.

In order to accomplish the above described objects, an image processing apparatus according to a fifth aspect of the invention is an image processing apparatus which reads an original image by dividing it into pixels, processes image data obtained by the reading and outputs an image signal corresponding to each pixel and this image processing apparatus includes: a color correcting device for generating image data corresponding to subtractive three primary colors based on image data of respective additive three primary colors obtained by reading the original image; a density correcting device for correcting the image data corresponding to the subtractive three primary colors according to a density designated and generating density correction image data; and a color editor for converting the density correction image data generated by the density correcting device to respective designated image data.

The image processing apparatus thus constructed is capable of forming an image with enhanced variety of color edition functions having no density change in color edited portion due to entire density correction in the formed image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram of an image processing apparatus B incorporated in the image reader portion IR of FIG. 1.

FIG. 22 is a block diagram of a color edition circuit according to the embodiment of the invention.

DESCRIPTION OF THE PREFERRED EMBODIMENT

An embodiment of the present invention will be described with reference to the drawings.

Figure 1:
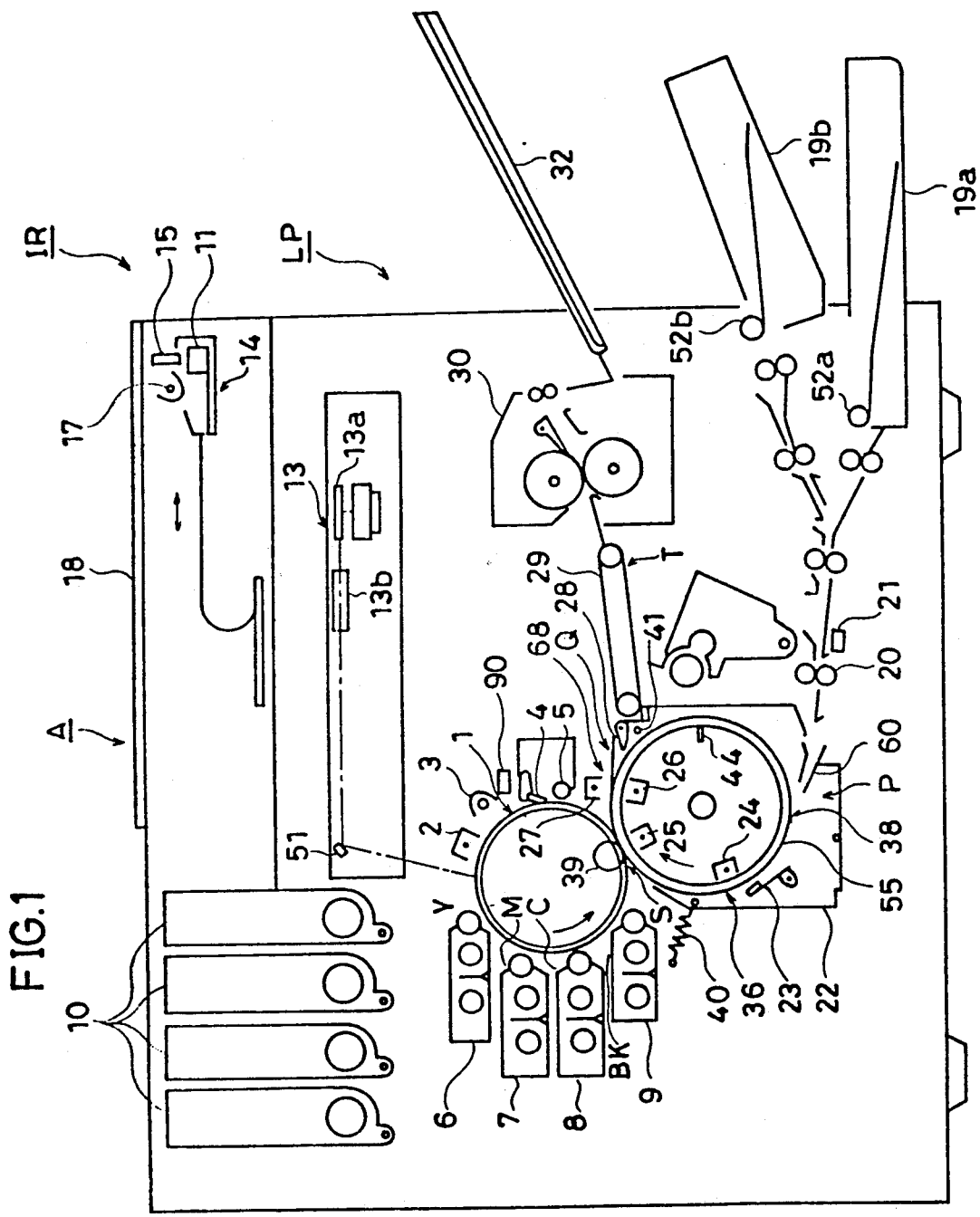
FIG. 1 is a sectional view showing a general construction of a digital copying apparatus A according to an embodiment of the present invention.

FIG. 1 is a front sectional view showing a general construction of a digital copying apparatus A.

The digital copying apparatus A comprises an image reader portion IR which applies various signal processing to pixel signals obtained by reading an image of an original and outputs an image signal, and a laser printer portion LP which forms a color image by an electrophotographic process based on the image signal transmitted from the image reader portion IR.

In the image reader portion IR, an original placed on a glass platen 18 is read as color signals of additive three primary colors, R (red), G (green), B (blue), by means of an exposure lamp 17, a rod lens array 15 and an image sensor 11. Those color signals of R, G, B are converted by a color correction circuit 105 to signals of four colors, i.e., three subtractive colors Y (yellow), M (magenta), C (cyan), plus Bk (black) and after various processing of those signals, the signals thus processed are transmitted as image signals to the laser printer portion LP including a laser optical system 13.

The digital copying apparatus A of the present embodiment does not have an image memory for three colors and a slider 14 scans the original for copy of each color and, based on the results, the signals of the respective colors are transmitted to the laser printer portion LP in the order of C, M, Y and Bk.

The laser optical system 13 of the laser printer portion LP includes a polygon mirror 13a for scanning, an Fθ lens 13b, a reflector mirror 51 and so on, and it applies a laser beam for image formation controlled by the signals of C, M, Y, Bk to a photoreceptor drum 1, whereby an exposure process is performed.

The photoreceptor drum 1 is rotated counterclockwise. The surface of the photoreceptor drum 1 includes an organic photoreceptor having a charge generation layer and a charge transport layer on a conductive substrate, and it exhibits a high sensitivity particularly near a wavelength of 780 nm f the laser beam.

A drum cleaner 4, a toner receiving roll 5, an eraser lamp 3, and a corona charger 2 as well as four developer units are provided around the photoreceptor drum 1. The first developer unit 1 supplies toner of Y (yellow), the second developer unit 7 supplies toner of M (magenta), the third developer unit 8 supplies toner of C (cyan), and the four developer unit 9 supplies toner of Bk (black). Those toners are charged with minus polarity. The toner of each color stored in a toner hopper 10 is fed through a pipe (not shown) to each of the developer units 6, 7, 8, 9 in response to a feed signal.

Transfer sheets (copy paper sheets) such as plain paper or films for OHP are stored in paper feed cassettes 19a, 19b and those sheets are fed one by one by means of feed rollers 52a, 52b and so on. When a leading edge of the sheet contacts registration rollers 20, the sheet is temporarily stopped, whereby subsequent timing is set and skew correction is performed by a paper sensor 21. A transfer drum 36 is driven to rotate clockwise. The transfer drum 36 has a plurality of leading edge chucking claws 38. The leading edge chucking claws 38 chuck the leading edge of copy paper transported by means of the registration rollers 20 with prescribed timing.

Frames 22 which support the transfer drum 36 are supported rotatably around a shaft 41 and actuated clockwise by means of a spring 40. Thus, the transfer drum 36 is pressed against a positioning roller 39 provided on the side of the photoreceptor drum 1, so that the transfer drum 36 is maintained with a prescribed spacing from the photoreceptor drum 1.

An absorption charger 24, a transfer charger 25, and a first eraser charger 26 are provided inside the transfer drum 36. A grounding electrode 23 opposite to the absorption charger 24, and a second eraser charger 27 opposite to the first eraser charger 26 are provided outside the transfer drum 36, and a separation claw unit Q includes a separation claw 28, and a jam detector 90 for detecting occurrence of jam of a separated transfer sheet. The jam detector 90 is preferably a photosensor of a reflection type.

The absorption charger 24 effects corona discharge of minus polarity. Thus, a dielectric screen 55 of the transfer drum 36 is charged with minus polarity and the copy paper transported in a chucked state to the transfer drum 36 by the leading edge chucking claws 38 is electrostatically absorbed on the dielectric screen 55. On this occasion, the grounding electrode 23 contacts the copy paper and eliminates the effect of the absorption charger 24 onto the copy paper, so that the copy paper is electrostatically absorbed on the transfer drum 36 with reliability.

The transfer charger 25 is disposed in a transfer portion S where the photoreceptor drum 1 and the transfer drum 36 become closest to each other, and by corona discharge of plus polarity, a toner image on the photoreceptor drum 1 is electrostatically transferred onto the transfer sheet on the transfer drum 36.

Alternating voltage is applied to the first and second eraser chargers 26 and 27 and those chargers constitute an eraser charger unit 68. The first eraser charger 26 removes mainly the charge on the dielectric screen 55, thereby reducing the electrostatic absorption force of the transfer sheet. The second eraser charger 27 removes mainly the charge on the transfer sheet when it is separated, thereby preventing discharge and dispersion of toner due to the separation.

The copy paper separated from the transfer drum 36 by the separation claw 28 is sent to the fixing device 30 by sheet transfer means T such as a conveyer 29, and after it is thermally fixed, it is discharged to an outlet tray 32. A position detector 44 detects a rotation reference position of the transfer drum 36.

Figure 2:
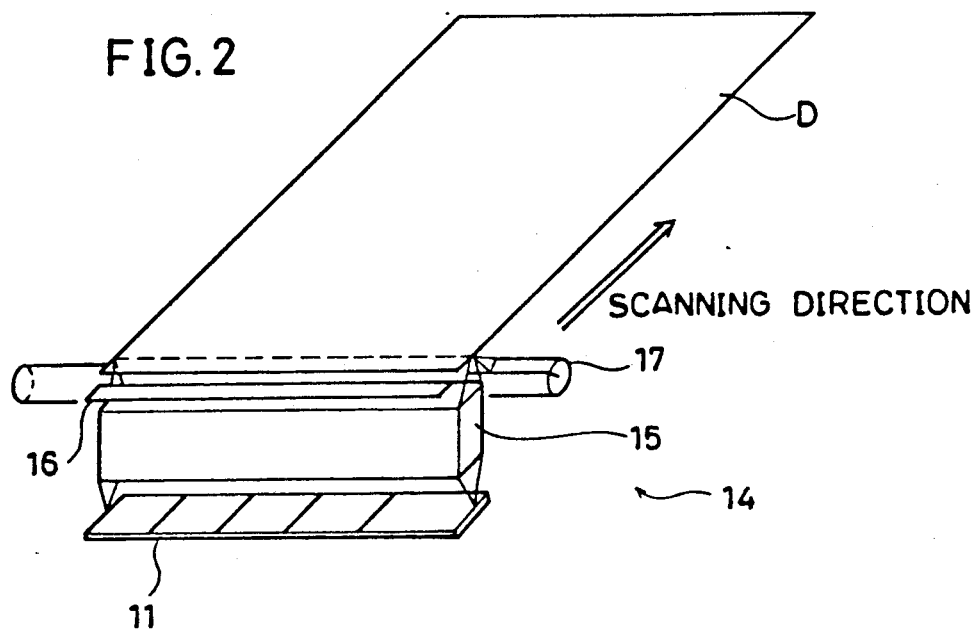
FIG. 2 is a perspective view showing an optical system of an image reader portion IR in FIG. 1.
Figure 3:
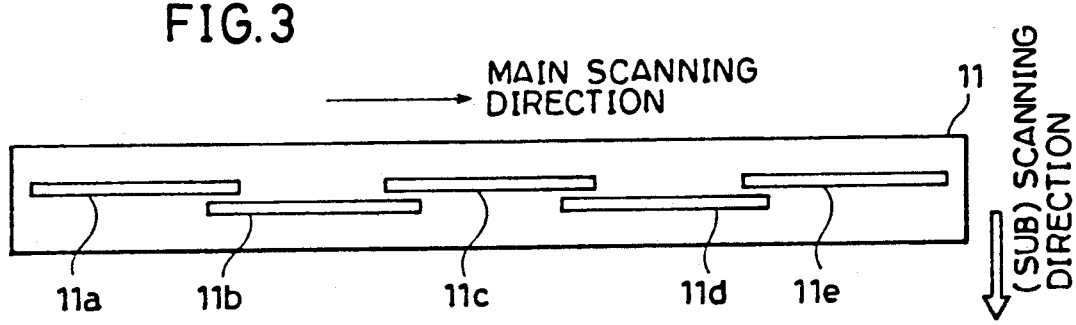
FIG. 3 is a plan view of the image sensor of FIG. 1.
Figure 4:
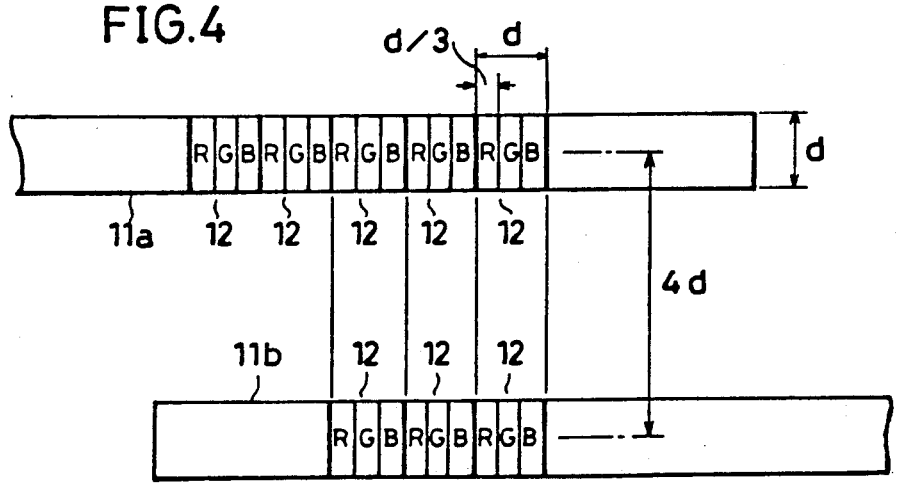
FIG. 4 is an enlarged view schematically showing light receiving portions of the CCD sensor chips of FIG. 3.
Figure 5:
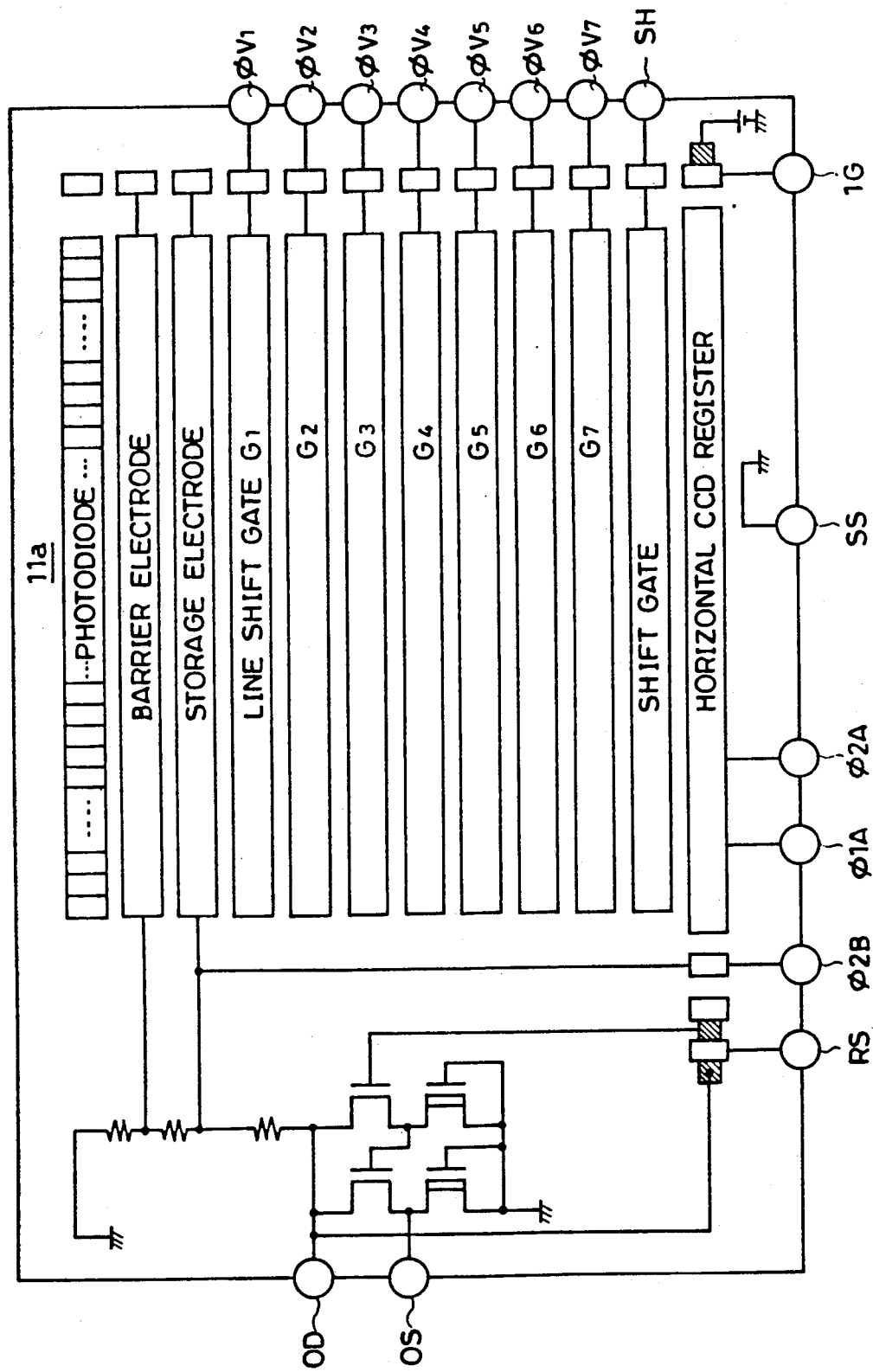
FIG. 5 is a block diagram showing a drive circuit of the CCD sensor chips of FIG. 3.
Figure 6:
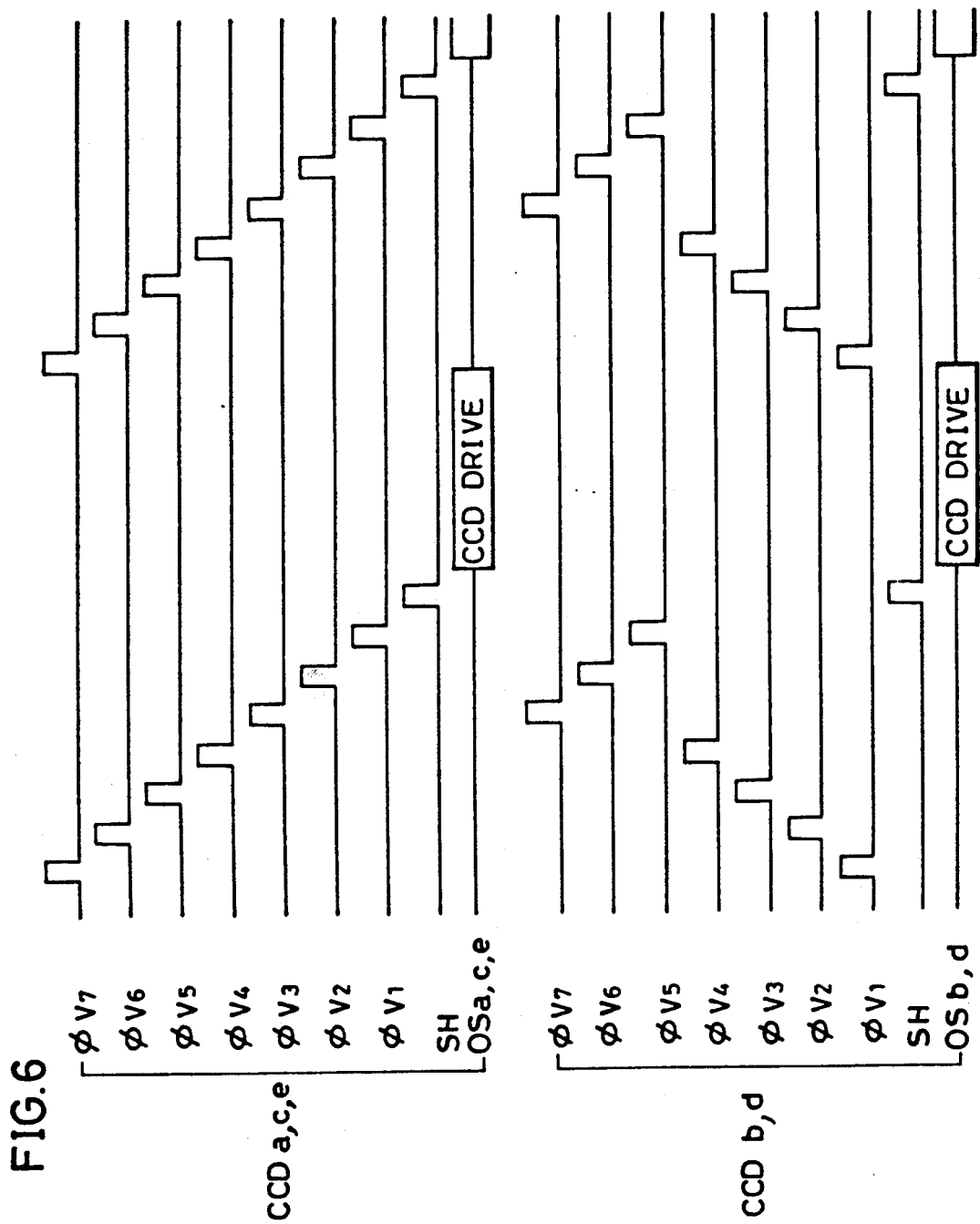
FIG. 6 is a time chart showing drive operation of the CCD sensor chips of FIG. 3.
Figure 7:
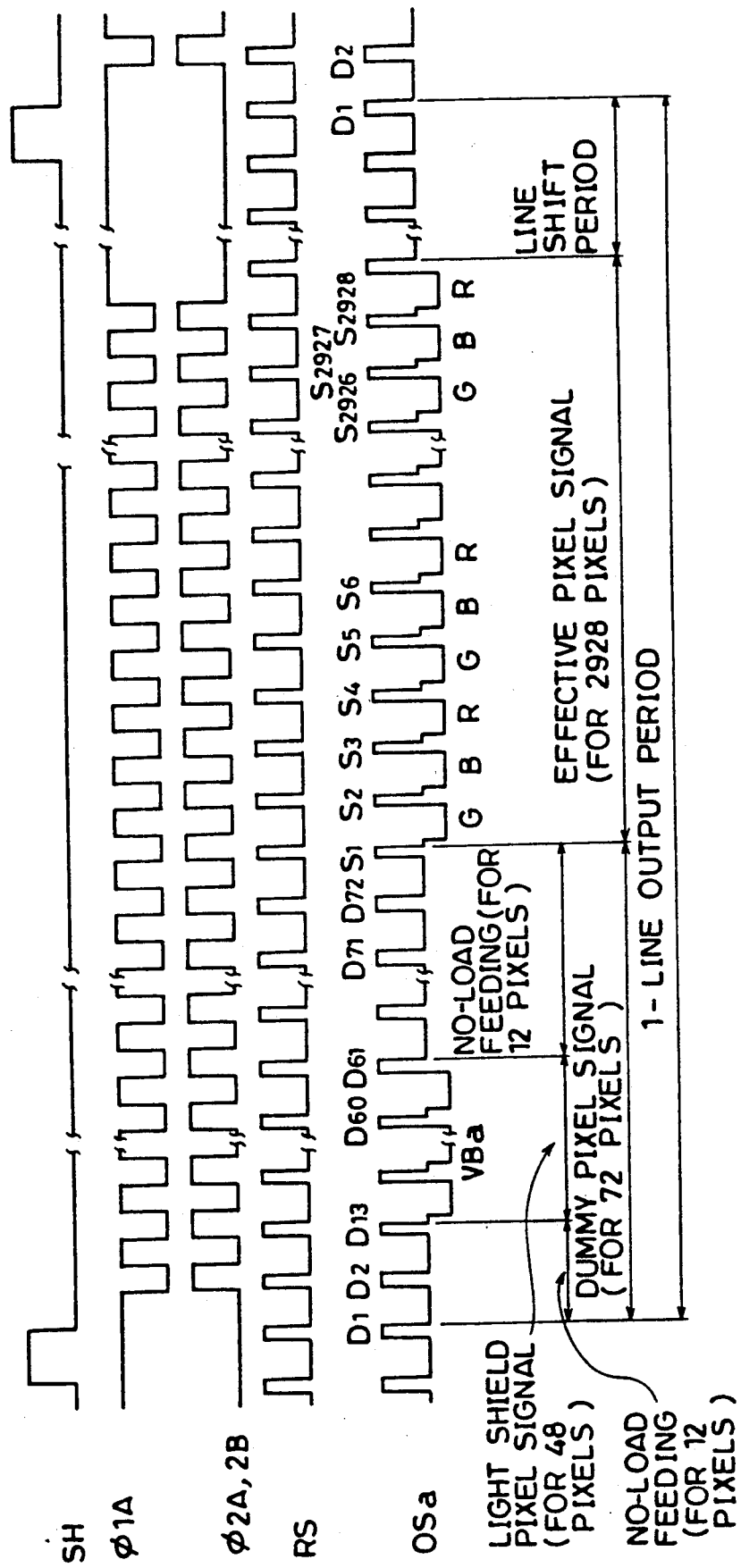
FIG. 7 is a time chart showing outputs of the CCD sensor chips of FIG. 3.

FIG. 2 is a perspective view showing the optical system of the image reader portion IR; FIG. 3 is a plan view of an image sensor 11; FIG. 4 is an enlarged view typically showing light receiving portions of CCD sensor chips 11a, 11b; FIG. 5 is a block diagram showing a drive circuit of the CCD sensor chip 11a; FIG. 6 is a time chart showing drive operations of the CCD sensor chips 11a to 11e; and FIG. 7 is a time chart showing outputs of the respective CCD sensor chips 11a to 11e.

An original D placed on the glass platen 18 is line-scanned in a sub scanning direction by the slider 14 including the image sensor 11 and it is read by decomposition into additive three primary colors R, G, B by means of the optical system of the equal magnification type having an exposure lamp 17, a rod lens array 15, and the image sensor 11. The rod lens array 15 includes an interference film filter (not shown) for intercepting infrared rays.

The image sensor 11 includes as shown in FIG. 3, five CCD sensor chips 11a to 11e of a contact type, which are disposed alternately and continuously in a width direction (the main scanning direction) and spaced alternately with prescribed pitches in a length direction (the sub scanning direction). Since spacings of the prescribed pitches are provided in the sub scanning direction, a delay occurs in output signals from the rear CCD sensor chips 11a, 11c, and 11e in the sub scanning direction. This delay can be compensated for in a manner where output signals OSb, OSd from the front CCD sensor chips 11b, 11d are delayed by four lines by setting timing of pulse signals $\phi V1$ to V7 applied to line shift gates G1 to G7 of the CCD sensor chips 11a to 11e, as shown in FIG. 6.

Each of the CCD sensor chips 11a to 11e has an end including a large number of elements 12 arranged in one line, each having an area of 62.5 $\mu m^2$ (d=1/16 mm), as shown in FIG. 4.

Each element 12 is divided into three parts, each having a spectrum filter for receiving light of one of the three primary colors R, G, B.

Each one of such elements 12 corresponds to a pixel obtained by finely dividing an original image and a photoelectric conversion output of one element 12 represents an intensity of reflected light of one color of one pixel.

FIG. 8 is a block diagram of an image processing unit B incorporated in the image reader portion IR.

In the image sensor 11, the four CCD sensor chips 11a to 11e are driven simultaneously to enhance the reading speed in the main scanning direction, so that effective read pixel signals for 2928 pixels of RGB colors in total are serially outputted from those chips as shown in FIG. 8.

The photoelectric conversion outputs of the five lines serially outputted simultaneously from the five CCD sensor chips 11a to 11e are processed in image processing circuits 101 to 110 as described below which constitute an image processing unit B together with a line memory 111, a central processing unit (CPU) 112, and a ROM 113.

First, those outputs are digitized by the digitizing processing circuit 101 having a sample-and-hold circuit and an A/D converter and converted to 8-bit (256 gradation) digital data. Then, the digital data are separated into image data of the respective colors by a latch circuit and the image data are inputted to the 5-channel compositing circuit 102.

In the 5-channel compositing circuit 102, image data for two lines are temporarily stored in 15 (3×5) first-in first-out memories corresponding to respective chips and respective colors, and the image data from each chip is successively selected and read for a period of one line, whereby a serial image data corresponding to an arrangement of pixels (the order of scanning) is produced.

The image data of the respective colors transmitted simultaneously as the serial image signals are supplied to a white balance correction circuit 103, where a relative ratio of the respective colors is adjusted and normalized, so that an image of a correct tone can be formed by the laser printer portion LP.

Next, a shading correction circuit 104 performs a correction according to a luminous intensity distribution (irregularity in light quantity) in the main scanning direction of the exposure lamp 17 and a difference of sensitivity of the respective elements 12. Then, a data signal proportional to intensity of reflected light is logarithmically converted according to visual characteristics in view of a range of reading the original D, whereby a density data signal proportional to the density of the original D is obtained.

A color correction circuit 105 performs masking processing for producing density data corresponding to the three primary colors Y, M, C of the printing toners from the density data corresponding to the colors R, G, B, black paint (B) processing for producing density data corresponding to the black color (Bk), under-color removal (UCR) processing, and monocolor conversion processing, as described above. A gamma correction circuit 106 performs background color removal processing for forming a clear image with an enhanced entire contrast, and density adjusting processing for forming an image of a density designated by operation keys (not shown).

A color edition circuit 107 performs processing for three types of color image edition, i.e., negative/positive inversion, color change, and painting.

A variable magnification edition processing circuit 108 performs processing for changing the output timing or output order of the density data signals, or a scanning speed in the sub scanning direction in order to form an image with an expanded or reduced magnification and an image by edition such as movement or mirror inversion by using a thinning method or an interpolation method. An MTF correction circuit 109 performs processing of smoothing for preventing generation of Moire fringes and edge emphasis processing for covering edge loss.

The density data D97 to 90 thus obtained by the various signal processing methods are binary-processed by an area gradation method in a gradation reproducing circuit 110 and the data are provided as image signals VIDE04 to 0 to the laser printer portion LP.

The CPU 112 controls the respective image processing operation and the operation of the slider 14 and serially communicates data with a host CPU, not shown, for controlling signal inputs from various keys on an operation panel provided on the upper surface of the digital copying apparatus A, an area designation editor (not shown) for color edition or various sensors, and controlling the operation of the laser printer portion LP. The line memory 111 temporarily stores image data in a specified processing stage. Programs and various data are read from the ROM 113.

The image processing operation will be described below according to the transmission order of signals. The reference characters a, b, c, d, e in the below description indicate correspondence with the respective CCD sensor chips 11a, 11b, 11c, 11d, 11e and the characters R, G, B, Y, M, C, Bk indicate correspondence with the above mentioned colors. The characters corresponding to plural chips or colors are sometimes shown together in parentheses.

Figure 9A:
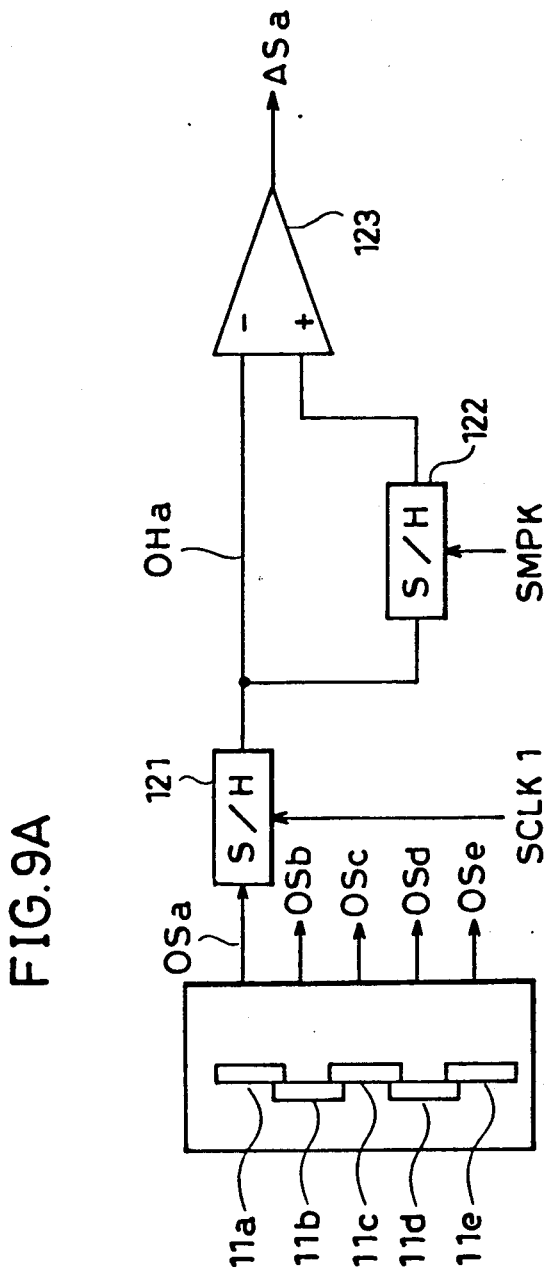
FIGS. 9A to 9C are block diagrams of a digital processing circuit 101 according to the embodiment of the invention.
Figure 9B:
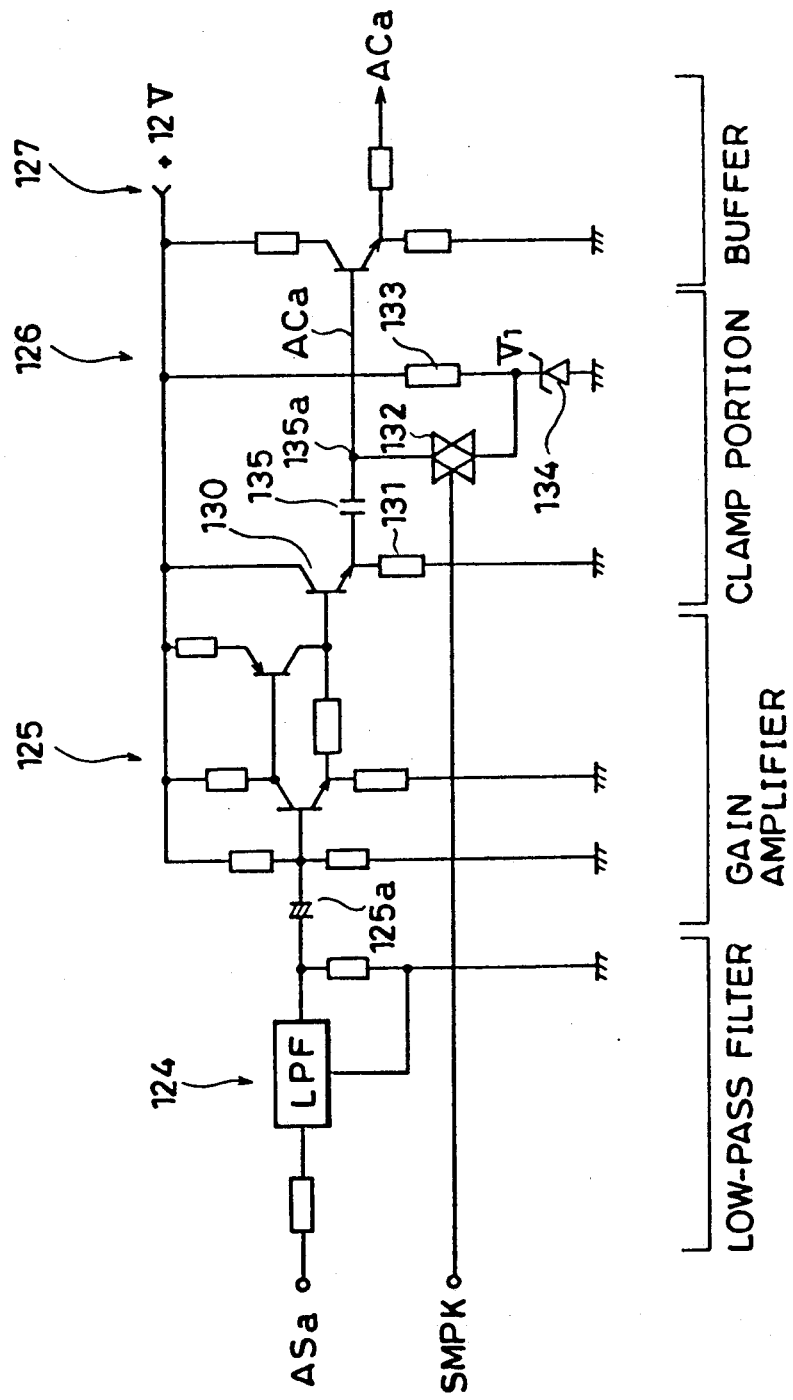
Figure 9C:
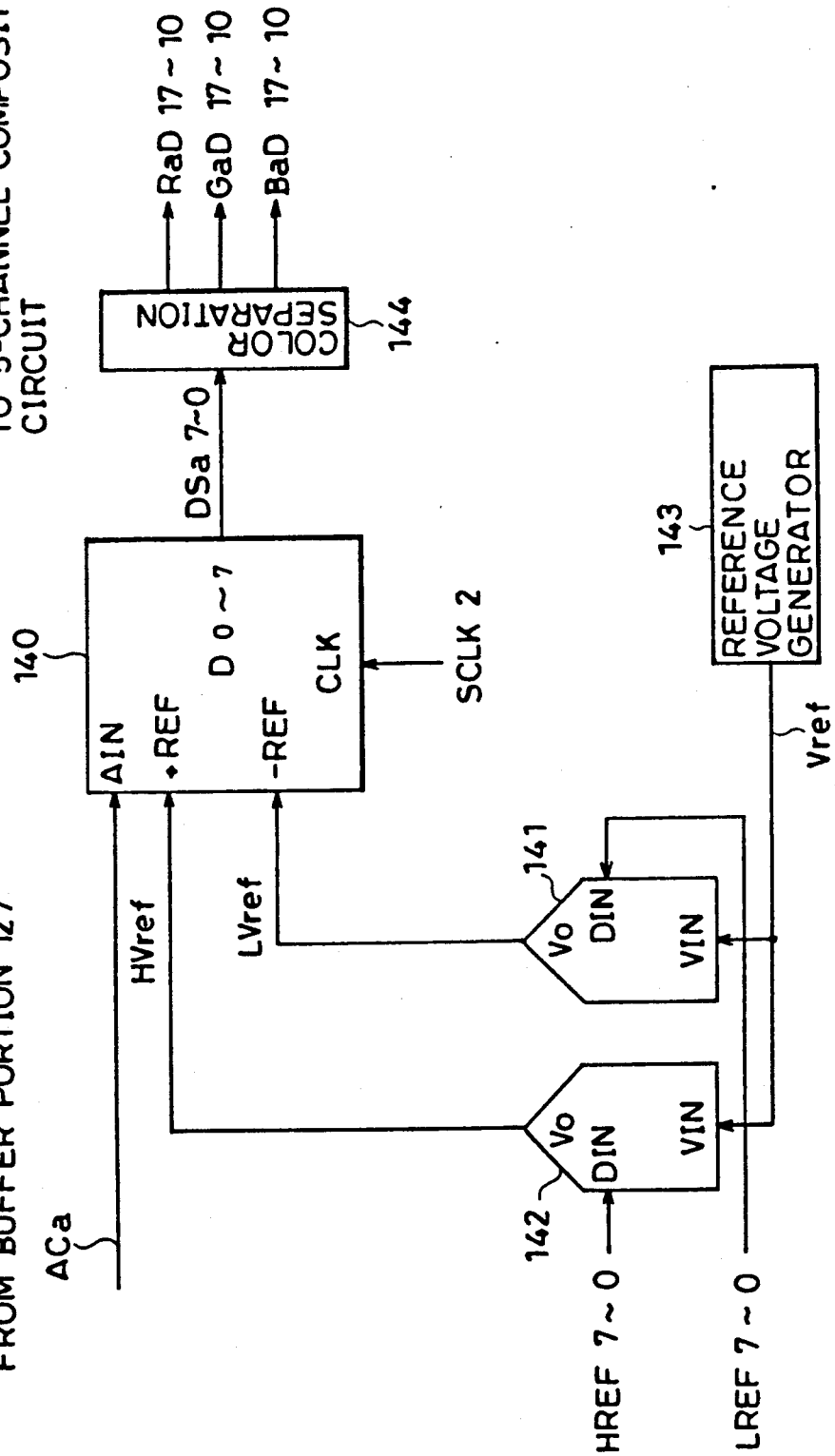
Figure 10:
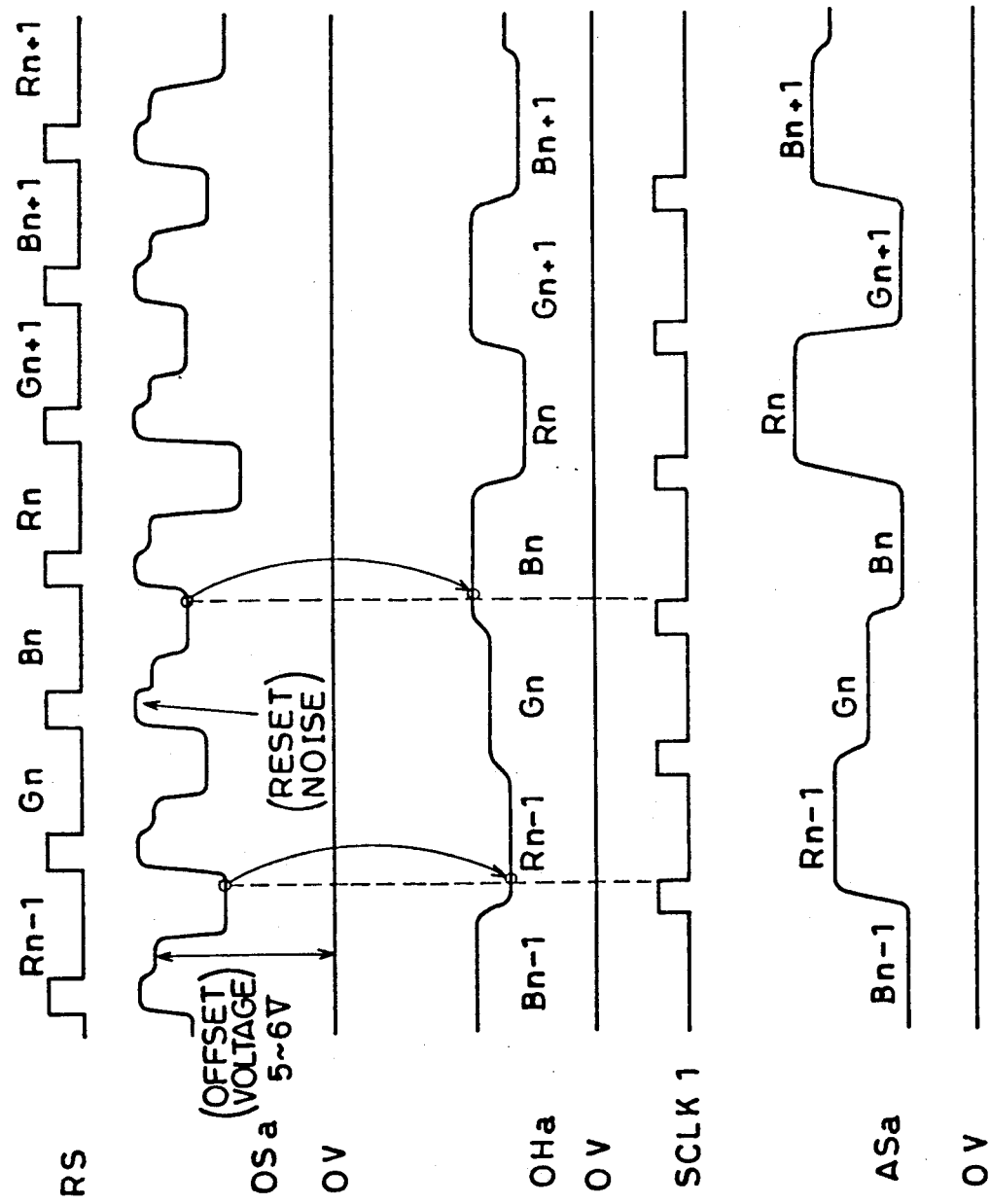
FIG. 10 is a signal waveform diagram showing sample-and-hold operation for effective pixel signals according to the embodiment of the invention.
Figure 11:
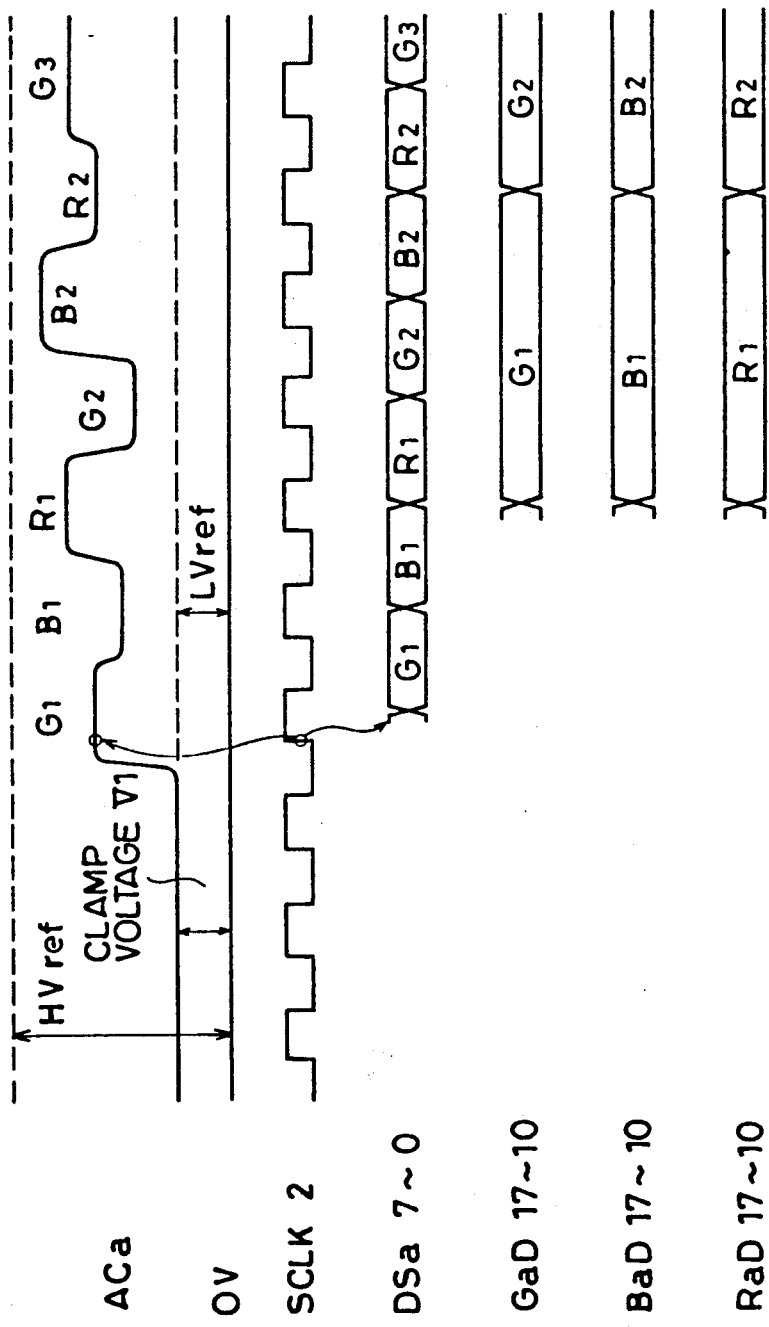
FIG. 11 is a signal waveform diagram showing A/D conversion operation according to the embodiment of the invention.

FIGS. 9A, 9B and 9C are block diagrams of the digitizing processing circuit 101; FIG. 10 is a signal waveform diagram showing sample-and-hold operation for effective pixel signals; and FIG. 11 is a signal waveform diagram showing A/D conversion operation. In those figures, the circuit configurations of the portions corresponding to the respective CCD sensor chips 11a to 11e are identical and therefore only the portion corresponding to the CCD sensor chip 11a is shown.

As shown in FIG. 10, a photoelectric conversion signal OSa provided from the CCD sensor chip 11a in synchronization with a read clock signal RS is an analog signal containing reset noise and changing in the negative direction according to intensity of reflected light from the original D with respect to an offset potential of 5 to 6 V.

In order to extract pixel information by removing the reset noise, a first sample-and-hold circuit 121 shown in FIG. 9A starts sampling of the photoelectric conversion signal OSa with rise timing of a sample-and-hold signal SCLK1 and holds the potential at the fall timing.

A second sample-and-hold circuit 122 samples a light shield pixel signal (as shown in FIG. 7) provided from the element 12 where the light is intercepted, in response to a signal SMPK for one line, and it holds the potential VBa at a black level.

An output OHa of the first sample-and-hold circuit 121 is differentially amplified by an amplifier 123 with reference to the black level provided by the second sample-and-hold circuit 122 and pixel information for each color corresponding to one pixel is outputted as an image signal ASa in the order of G, B, R.

The pixel signal ASa is supplied to a clamp portion 126 through a low-pass filter 124 and a gain amplifier 125. The low pass-filter 124 removes a clock noise overlapped by the sample-and-hold operation in the processing stage from the pixel signal ASa. The gain amplifier 125 compensates for a signal loss caused by the low-pass filter 124. At the time of the input to the gain amplifier 125, a DC component is removed from the pixel signal ASa by a coupling capacitor 125a.

The clamp portion 126 comprises a transistor 130 and a resistor 131 constituting a buffer stage, a clamp capacitor 135, a resistor 133 and a Zener diode 134 for setting a clamp potential, and an analog switch 132 to be opened or closed in response to the signal SMPK.

As described above, in a black level sampling period at an initial stage of one line scanning, the signal SMPK is at a logical high ("H") level and at this time the analog switch 132 is closed to set the potential at the output terminal 135a of the clamp capacitor 135 to a clamp potential Vl ($\approx 1$ V) defined by a breakdown voltage of the Zener diode 134. Accordingly, the pixel signal ASa inputted in a logical low ("L") level period of the signal SMPK becomes a signal changing with the clamp potential V1 as the lowest potential (as shown in FIG. 11). The pixel signal ASa thus clamped is applied to an analog input terminal AIN of the A/D converter 140 shown in FIG. 9C through the buffer 127 including an emitter follower circuit.

The A/D converter 140 compares as shown in FIG. 11 the clock signal SCLK2 and the pixel signal ACa between the voltages applied to a lower reference terminal −REF and an upper reference terminal +REF, whereby the pixel signal ACa is quantized and converted to image data DSa7 to 0 of eight bits (256 gradations) from the minimum value "0" to the maximum value "255". The image data DSa7 to 0 obtained by the conversion are separated into image data RaD17 to 10, GaD17 to 10, BaD17 to 10 corresponding to the respective colors R, G, B by means of a color separation circuit 144 which performs latch operation in two stages, and the separated image data are supplied to the 5-channel compositing circuit 106 in the succeeding stage.

The lower reference terminal −REF of the A/D converter 140 is supplied with a lower reference potential LVref generated based on the lower reference data LREF7 to 0 by a D/A converter 141. The upper reference terminal +REF is supplied with an upper reference potential HVref generated based on the upper reference data HREF7 to 0 by a D/A converter 142. A negative reference voltage Vref is applied from a reference voltage generator 143 to both D/A converters 141 and 142.

The D/A converters 141 and 142 generate the lower reference potential LVref or the upper reference potential HVref by calculation shown by the below equation (1).

$$Vo = (x/255) \times |Vref| \ldots \quad (1)$$

where Vo is LVref or HVref, and x is LREF7 to 0 or HREF7 to 0.

Figure 12:
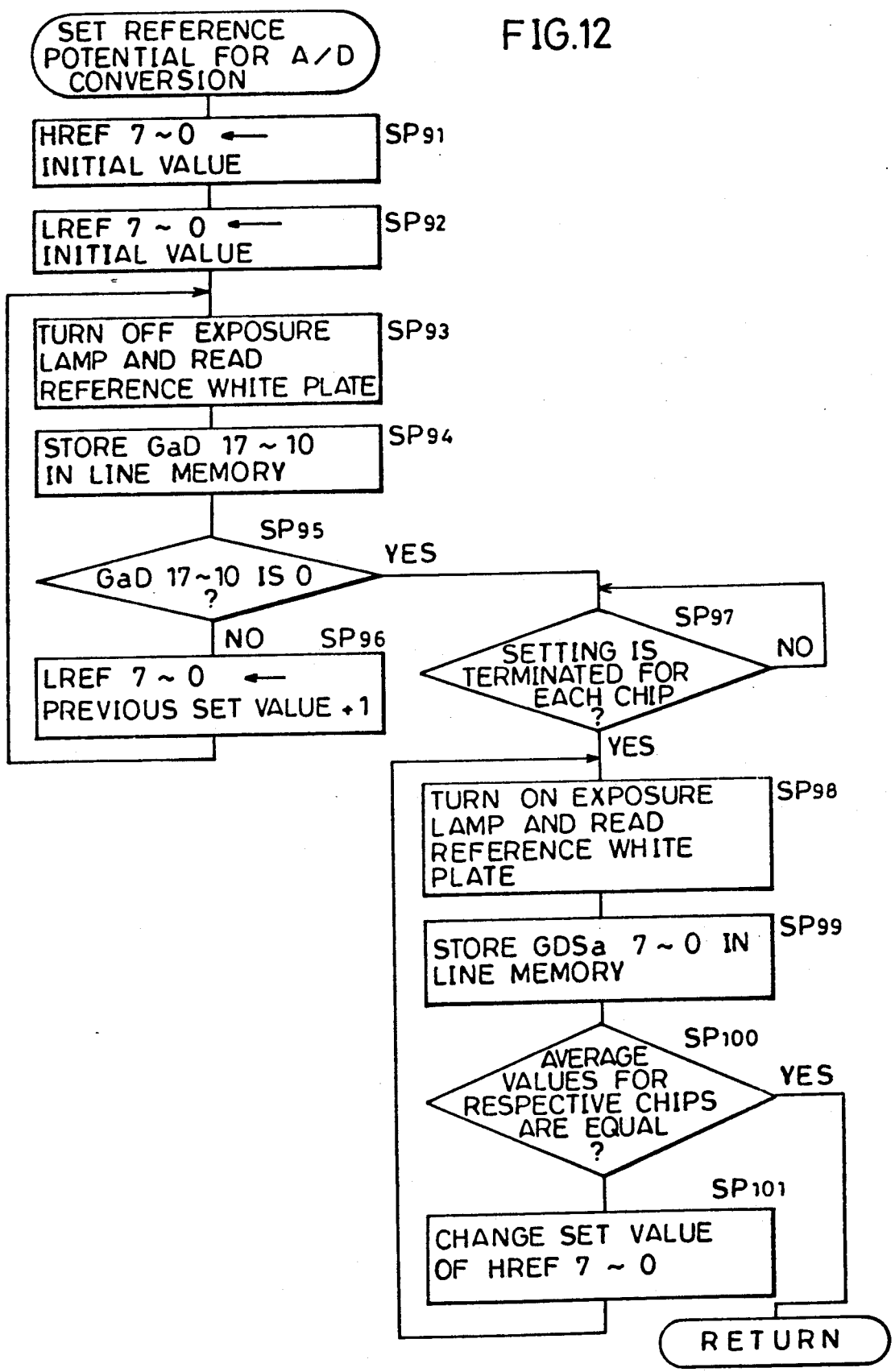
FIG. 12 is a flowchart of reference potential setting in A/D conversion controlled by the CPU 112 according to the embodiment of the invention.

FIG. 12 is a flowchart of reference voltage setting in A/D conversion controlled by the CPU 112. This subroutine in FIG. 12 is executed immediately after turn-on of the power supply of the digital copying apparatus A.

First, in step SP91, the upper reference data HREF7 to 0 is initialized. The initialized value is selected to be a value near "251" approximate to the maximum value.

Then, in step SP92, the lower reference data LREF7 to 0 is initialized so that the lower reference potential LVref is a little lower than the clamp potential V1.

In step SP93, a reference white paint 16 (as shown in FIG. 2) is read with the exposure lamp 17 being off in a wait position of the slider 14 and in step SP94, G image data GaD17 to 10 as the image information of a wavelength range having the maximum relative luminous efficiency out of the three colors is stored in the line memory 111.

In step SP95, it is determined whether the image data GaD17 to 10 is the lowest value "0" or not. If NO, the lower reference data LREF7 to 0 is set again in step SP96 to raise the lower reference potential LVref and then the flow returns to step SP93. If YES in SP95, this means that the setting of the lower reference potential LVref with respect to the CCD sensor chip 11a is completed. Consequently, those procedures are executed for the other CCD sensor chips 11b to 11e and the respective lower reference data LREF7 to 0 in A/D conversion are set. When setting in all the chips 11a to 11e is completed (in step SP97), the processing flow proceeds to step SP98 to start setting of the upper reference potential HVref.

In step SP98, the exposure lamp 17 is turned on and the reference white paint 16 is read. In step SP99, the image data GaD17 to 10 is stored in the line memory 111.

Then, in step SP100, it is determined whether the average values for one line of the image data G(a, b, c, d, e) D17 to 10 read in the CCD sensor chips 11a to 11e are equal or not.

If NO in step SP100, the set value of the upper reference data HREF7 to 0 is changed in step SP101 and the flow returns to step SP98.

If YES in step SP100, which means that the reference levels of A/D conversion for each of the CCD sensor chips 11a to 11e have been made uniform, the flow returns to the main routine for controlling other image processing or operations of respective parts of the digital copying apparatus.

Figure 13:
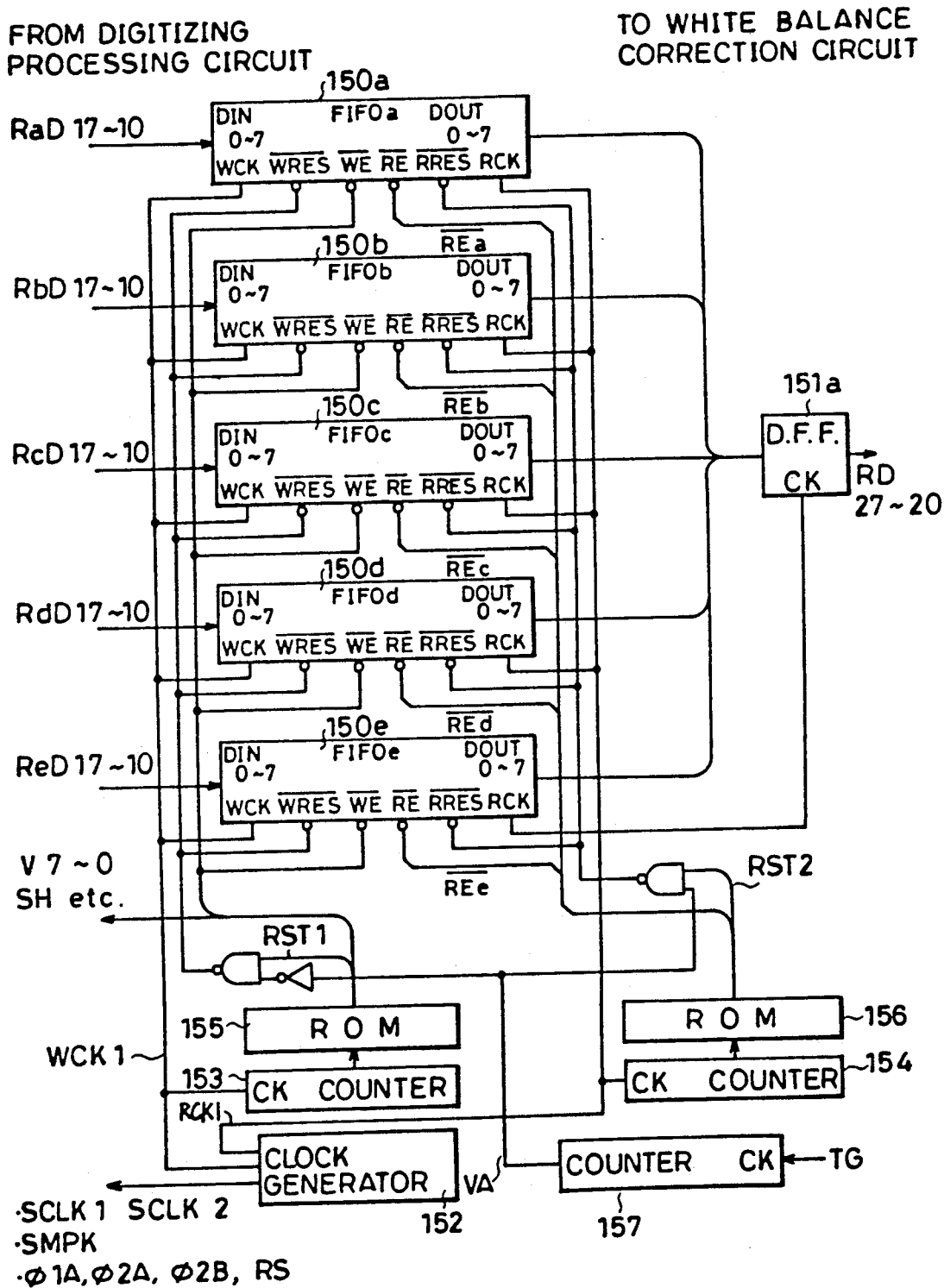
FIG. 13 is a block diagram of a 5-channel compositing circuit according to the embodiment of the invention.
Figure 14:
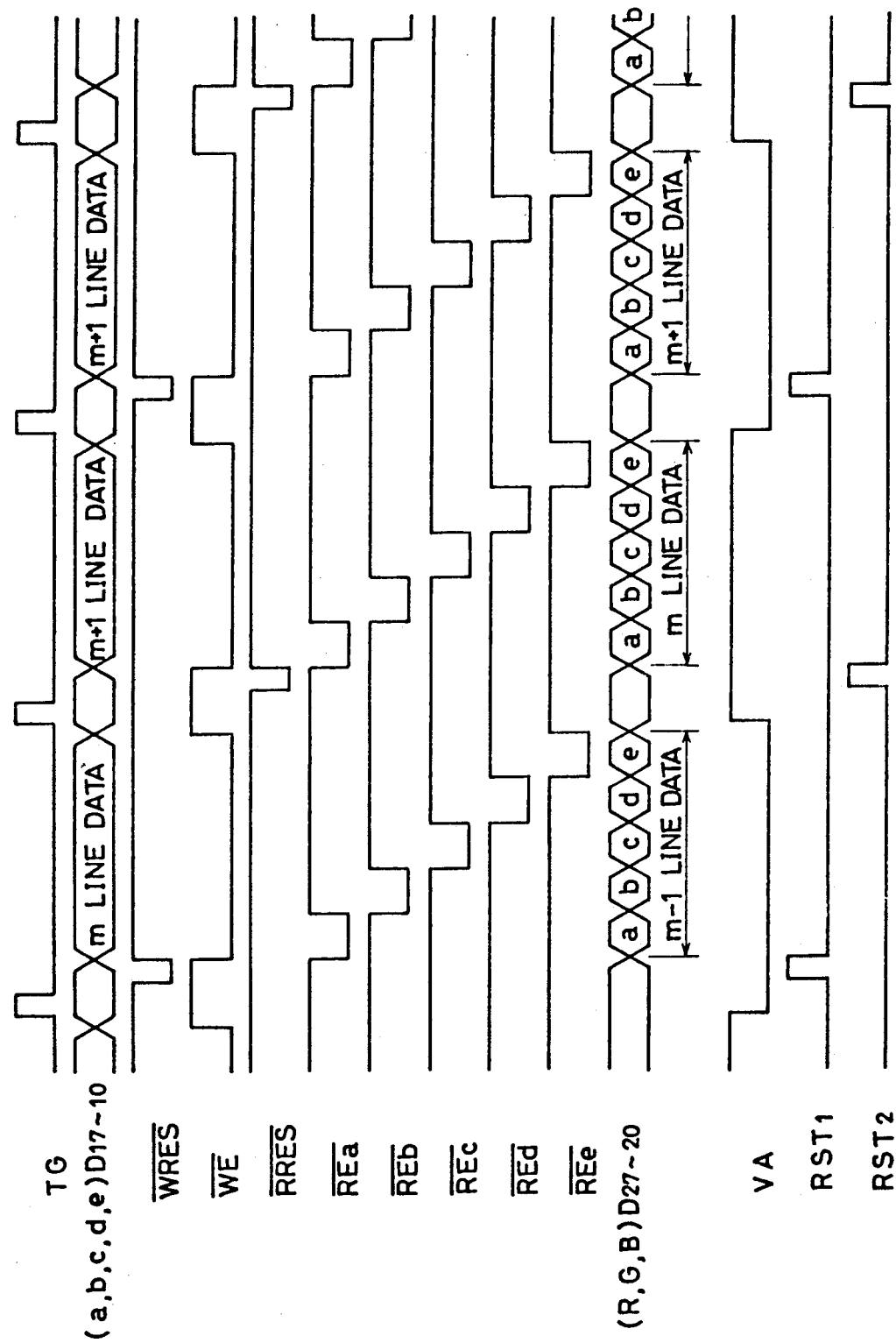
FIG. 14 is a time chart showing operation of the 5-channel compositing circuit of FIG. 13.

FIG. 13 is a block diagram of the 5-channel compositing circuit 102 and FIG. 14 is a time chart showing operation of the 5-channel compositing circuit 102.

The 5-channel compositing circuit 102 composites the image data (R, G, B) aD17 to 10, . . . (R, G, B) eD17 to 10 quantized simultaneously for the respective CCD sensor chips 11a to 11e in the digitlizing processing circuit 101 for the purpose of facilitating the processing in the succeeding stage. Then, image data RD27 to 20, GD27 to 20, BD27 to 20 serially outputted continuously according to the arrangement of pixels for one line for each color are generated. Since the circuit configuration for each color is identical, FIG. 14 shows only the portion corresponding to R out of the three colors.

The image data R (a, b, c, d, e) D17 to 10 outputted from the digitizing processing circuit 101 are temporarily stored in the first-in first-out memories 150a to 150e which perform write operation in response to a write enable signal WE. The write enable signal $\overline{WE}$ is a pulse of a one-line period, which is same as a horizontal synchronizing circuit TG as a reference of a one-line period, while a write reset enable signal $\overline{WRES}$ for resetting a write address to 0 has a two-line period. Accordingly, the image data R (a, b, c, d, e) D17 to 10 for two lines are stored in the respective first-in first-out memories 150a to 150e.

The first-in first-out memories 150a to 150e can perform write operation and read operation independently and simultaneously. The read operation is performed in an active (active low) period of respective read enable signals REa to REe. The first-in first-out memories 150a to 150e are controlled successively one by one to be in a read operation state. The read reset enable signal $\overline{RRES}$ is rendered active with a delay of the one-line period from the signal $\overline{WRES}$ in order to reset the read address to 0. Thus, write operation of the second line and read operation of the first line are performed in parallel and the image data RD27 to 20 are outputted as serial signals for one line without interruption through a latch circuit 151a including a D-flip-flop.

The signal $\overline{WRES}$ and the signal $\overline{RRES}$ are generated by counters 153, 154 which increment counts in response to a signal WCK1 or a signal RCK1 serving as a reference of access, provided from the clock generator 152, and by ROMs 155, 156 addressed by the outputs of the counters 153, 154.

The clock generator 152 also generates various clock signals SCLK1, SCLK2, $\phi$1A, $\phi$2A, $\phi$2B, RS and so on.

Figure 15A:
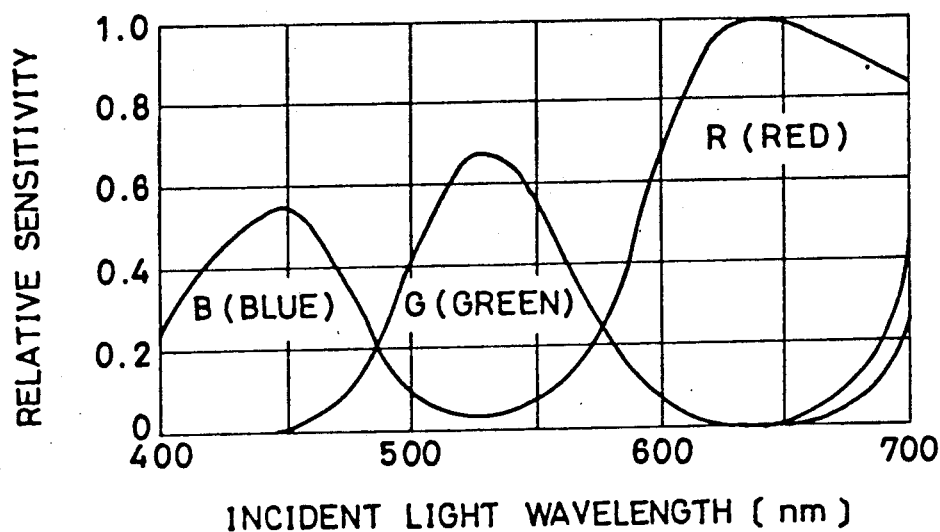
FIG. 15A is a graph showing spectral sensitivity characteristic of the image sensor of FIG. 3.
Figure 15B:
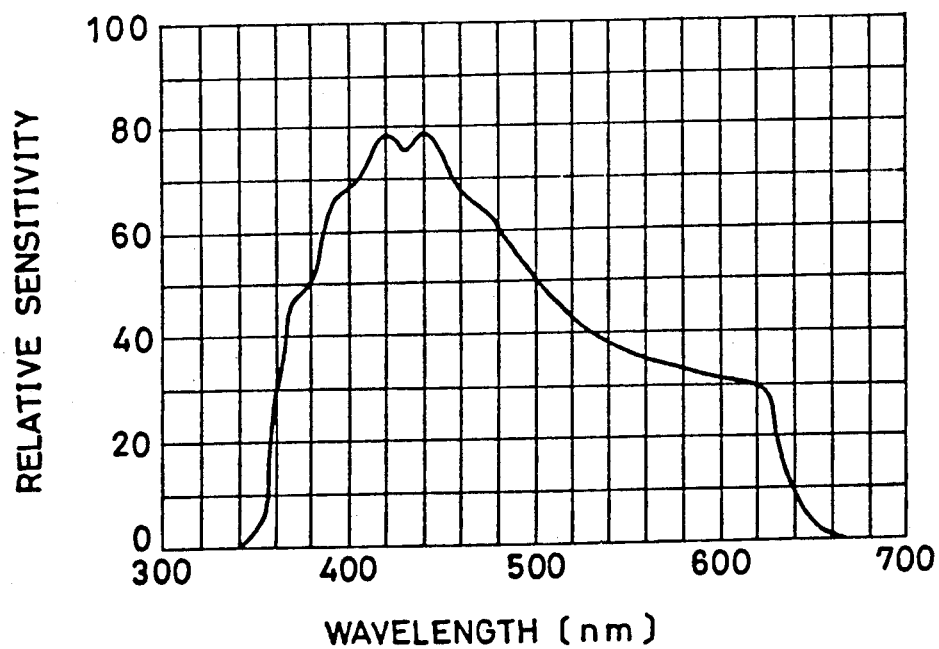
FIG. 15B is a graph showing spectral distribution characteristics of an exposure lamp and an interference film filter of a rod lens array.

FIG. 15A is a diagram showing spectral sensitivity characteristics of the image sensor 11, and FIG. 15B is a diagram showing a spectrum distribution characteristic of the interference film filter of the rod lens array 15 and the exposure lamp 17.

As is evident from FIGS. 15A and 15B, even after a uniform density of the reference white paint 16 (as shown in FIG. 2) is read, the image data RD27 to 20, GD27 to 20 BD27 to 20 of the respective colors from the 5-channel compositing circuit 102 have different values due to the spectral characteristics of the optical system. Therefore, white balance correction for forming an image of a correct tone is required.

Figure 16:
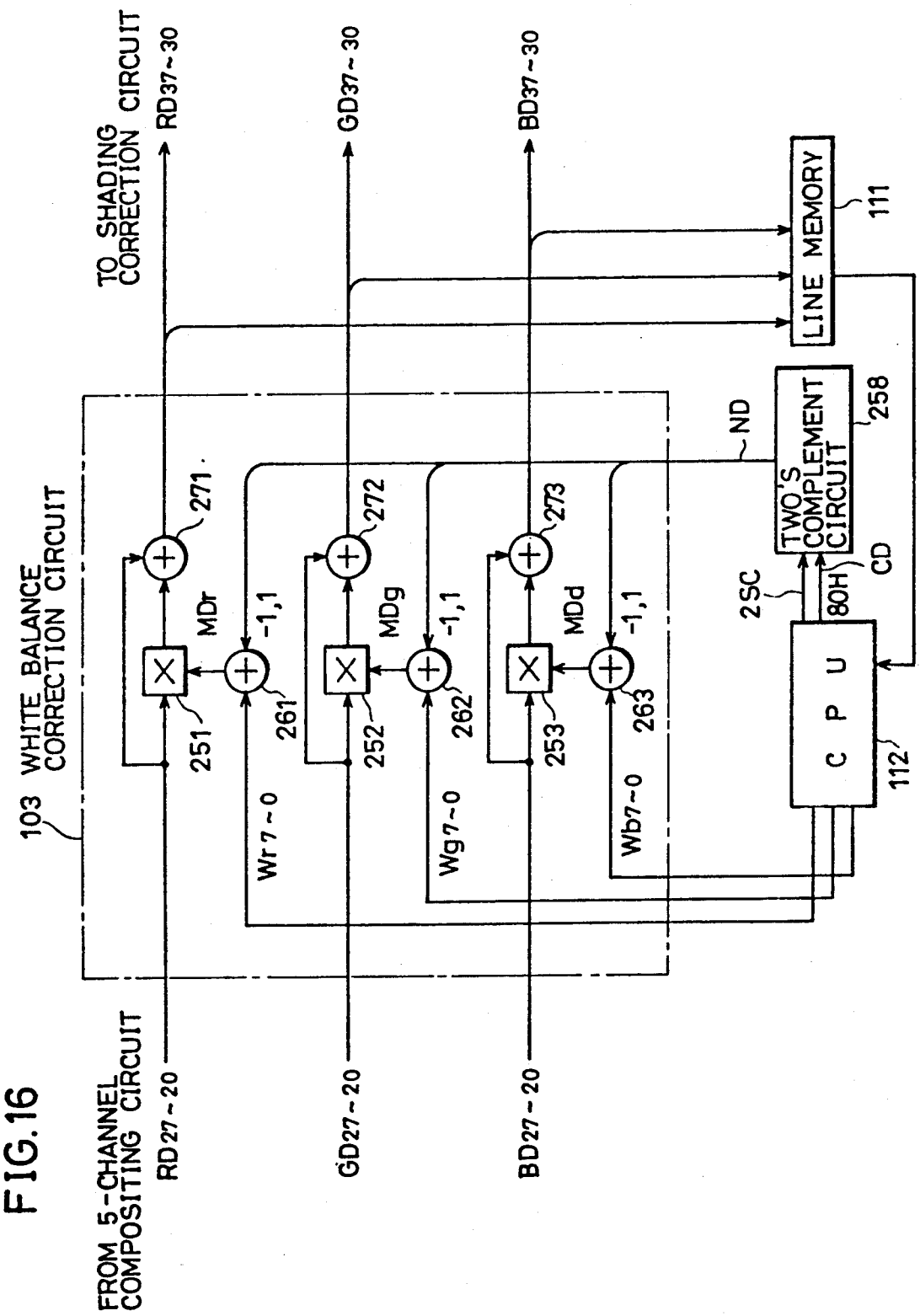
FIG. 16 is a block diagram of a white balance correction circuit according to the embodiment of the invention.

FIG. 16 is block diagram of the white balance correction circuit 103.

Referring to FIG. 16, the white balance correction circuit 103 performs correction based on correction coefficient data Wr7 to 0, Wg7 to 0, Wb7 to 0 (each having eight bits) supplied from the CPU 112 with respect to the image data RD27 to 20, GD27 to 20, BD27 to 20 (each having eight bits) of the respective colors from the 5-channel compositing circuit 102 and provides image data RD37 to 30, GD37 to 30, BD37 to 30 (each having eight bits) normalized to have a ratio of RGB of 1:1:1.

The white balance correction circuit 103 comprises: multiplying devices 251 to 253 which receive image data (R, G, B) D27 to 20 as multiplicands; adders 261 to 163 which add correction coefficient data Wr7 to 0, Wg7 to 0, Wb7 to 0 and auxiliary data ND from a two's-complement circuit 258 supplied in common for the respective colors and provide arithmetic sums as multiplier data MDr, MDg, MDb to the respective multiplying devices 251 to 253; and adders 271 to 273 which add the respective image data (R, G, B) D27 to 20 and the output data from the multiplying devices 261 to 263 and provide correction image data (R, G, B) D37 to 30.

The correction coefficient data Wr7 to 0, Wg7 to 0, Wb7 to 0 and the auxiliary data ND are all 8-digit decimal data having a decimal point between the most significant bit and the subsequent bit. More specifically, $2^0$, $2^{-1}, 2^{-2} \ldots, 2^{-7}$ are assigned in the order starting from the most significant bit and each of those data is treated as a decimal value for a step of $1/128$ ($2^{-7}$).

A bit signal (one integer) of 80 H (1000 0000B) is always supplied as a converted data CD from the CPU 112 to the two's-complement circuit 258. If the most significant bit (a code bit) of the correction coefficient data Wr7 to 0, Wg7 to 0, Wb7 to 0 is "0", the converted data CD is outputted directly as positive auxiliary data ND. If the code bit is "1", a complement of "2" of the converted data CD, namely "−1" is outputted as negative auxiliary data ND. Accordingly, the multiplier data MD (r, g, b) are values obtained by adding "1" to the correction coefficient data Wr7 to 0, Wg7 to 0, Wb7 to 0, or by subtracting "1" therefrom.

Figure 17:
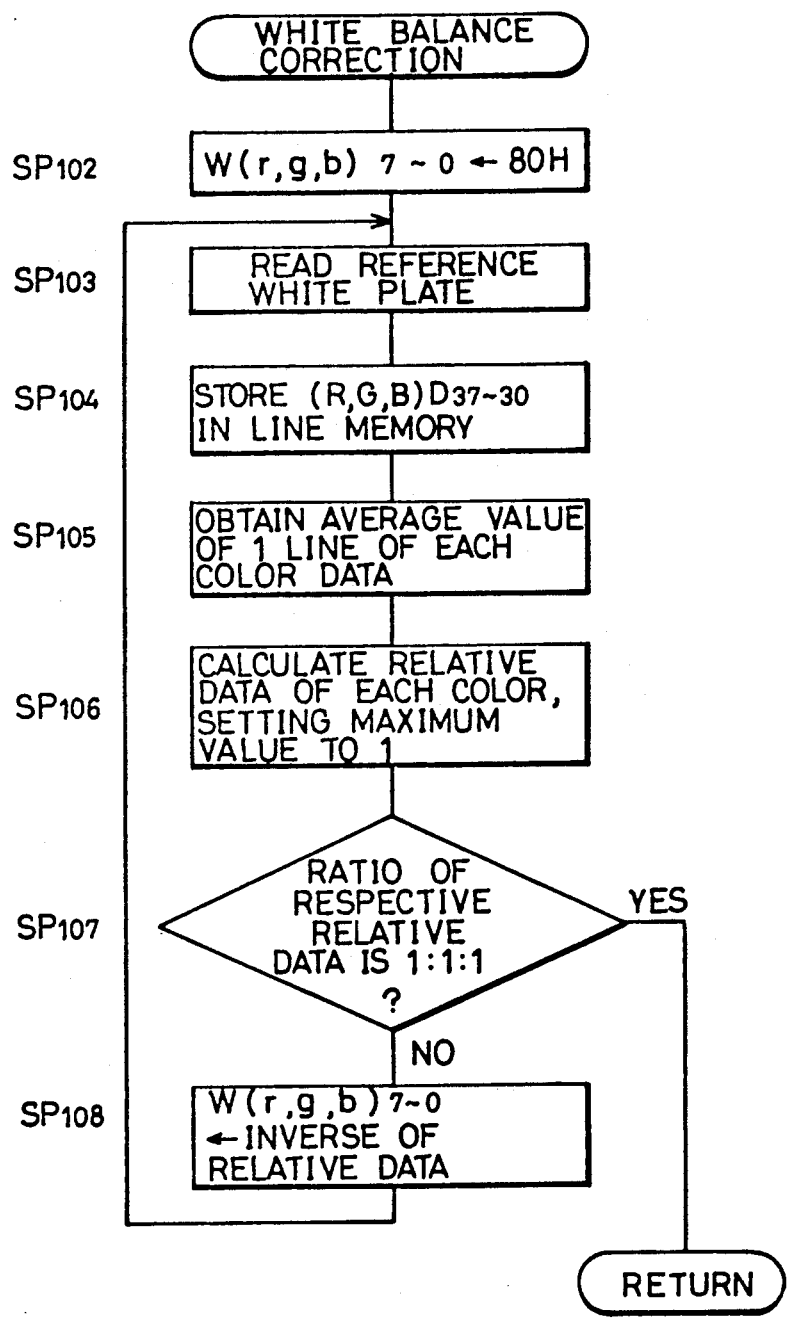
FIG. 17 is a flowchart of white balance correction processing controlled by the CPU according to the embodiment of the invention.

FIG. 17 is a flowchart of a subroutine of white balance correction processing controlled by the CPU 112. This subroutine can be executed at any time in view of a change with time in the optical system, but it is normally executed before a start of scanning of the original D each time the main power supply of the digital copying apparatus A is turned on.

First, in step SP102, 80H (the integer 1) is set as the correction coefficient data Wr7 to 0, Wg7 to 0, Wg7 to 0. Thus, the multiplier data MD(r, g, b) is 0 and since multiplication by 0 is performed in the multiplying device 251 to 253, the image data (R, G, B) D27 to 20 are directly outputted as image data (R, G, B) D37 to 30 from the adders 271 to 273.

Then, in step SP103, the exposure lamp 17 is turned on in the wait position of the slider 14 and the reference white paint 16 of a uniform density provided in an end portion of the glass platen is read. Theoretically, when the image of the reference white paint is read, image data of the three primary colors are equal but in reality there is a difference among the colors RGB as described previously.

Therefore, according to the present embodiment, in order to perform normalization to set the ratio of RGB to 1:1:1, calculation processing of the correction coefficient data Wr7 to 0, Wg7 to 0, Wb7 to 0 is performed in the subsequent steps SP104 to SP108.

In step SP104, correction image data (R, G, B) D37 to 30 outputted without substantial correction as described above are stored for one line in the line memory 111 and an average value in one line for each color is obtained in step SP105.

Next, in step SP106, relative data of the respective colors are calculated by setting the maximum value out of the three average values as 1, it is determined in step SP107 whether the ratio of the respective relative data is 1:1:1 or not. If YES in step SP107, this means completion of the normalization and the processing flow returns to the main routine for controlling other image processing or operation of respective portions of the digital copying apparatus. If NO, the flow proceeds to step SP108.

In step SP108, inverses of the relative data corresponding to the respective colors are set as the correction coefficient data Wr7 to 0, Wg7 to 0, Wb7 to 0 and at the same time the value of the code bit is transmitted as a control signal 2SC to the two's complement circuit 258. Then, the flow returns to step SP103.

For example, if the value of the relative data of R, G, B are "1", "0.95", and "065", "1/1" is set as the correction coefficient data Wr7 to 0, "1/0.95"="1+5/95" is set as the data Wg7 to 0, and "1/0.65"="1+35/65" is set as the data Wb7 to 0. Accordingly, since "1" is subtracted from the respective correction coefficient data W(r, g, b) 7 to 0, the multiplier data MDr, MDg, MDb to be added to the multiplying devices 251 to 253 are "0", "5/95" and "35/65", respectively.

When the image of the reference white paint 16 is read again in step SP103, the same image data as before, namely the image data (R, G, B) D to 27 to 20 which are "1", "95/100" and "65/100" when relative data are obtained, are inputted to the white balance circuit 103.

The multiplying device 252 corresponding to G performs multiplication by "5/95" and as a result the adder 272 outputs image data GD37 to 30 of "100/100" obtained by adding "5/100" outputted from the multiplying device 252 and "95/100" as the value of the image data GD27 to 20.

Similarly, with aspect to B, multiplication and addition operations are performed and image data BD37 to 30 corresponding to the image data RD37 to 30 with respect to R are outputted from the adder 273.

Accordingly, the ratio of the image data (R, G, B) D37 to 30 after the correction of the respective colors corresponding to the image data (R, G, B) D27 to 20 obtained by reading of the image of the reference white paint 16 is 1:1:1 and thus white balance correction is completed.

Thereafter, when the original D is read, the white balance correction circuit 103 corrects the image data inputted from the preceding stage by performing calculation based on the set correction coefficient data W(r, g, b) 7 to 0 and transmits the data obtained by the correction to the image processing circuit in the succeeding stage.

Figure 18:
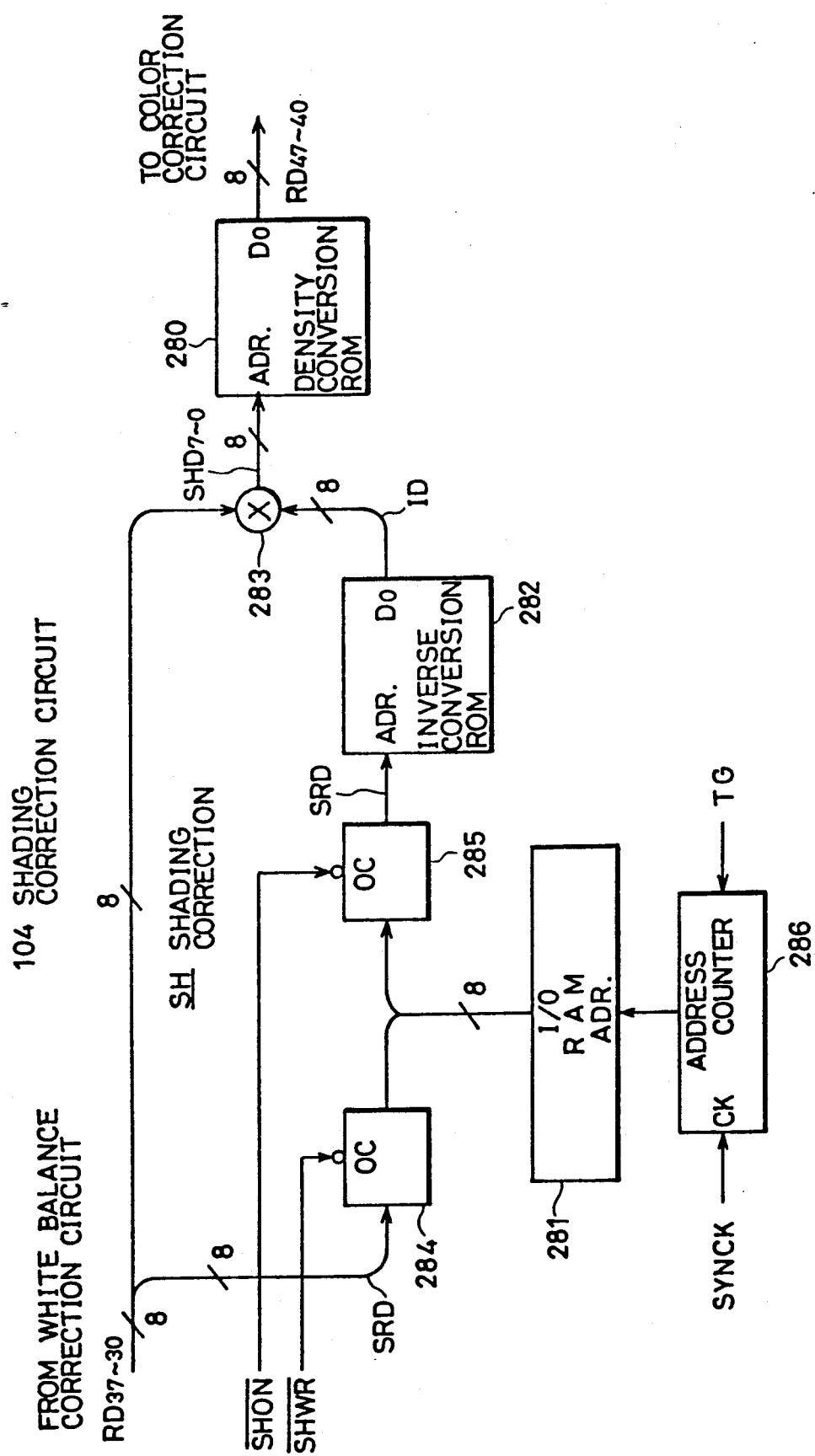
FIG. 18 is a block diagram of a shading correction circuit according to the embodiment of the invention.

FIG. 18 is a block diagram of the shading correction circuit 104.

The shading correction circuit 104 comprises shading correction portions SH provided with respect to the image data RD37 to 30, GD37 to 30, BD37 to 30 (each having eight bits) of the three primary colors from the white balance correction circuit 103, and a density conversion ROM 280. Since the circuit configuration for each color is identical, only the portion corresponding to the image data RD37 to 30 is shown in FIG. 18.

The shading correction portion SH comprises a RAM 281 for storing reference image data SRD for one line obtained by reading the reference white paint 16 as the reference color image; an inverse conversion ROM 282 for providing inverse data ID of the reference image data SRD read from the RAM 281; and a multiplying device 283 for multiplying the image data RD37 to 30 obtained by reading the original image by the inverse data ID.

The RAM 281 has a capacity of 8 K bytes and it is capable of storing reference image data SRD for one line (for 8000 pixels) in the main scanning direction. Since data are written and read through a common input/output port, gate circuits 284, 285 are provided to avoid collision of input and output data. Addressing for the RAM 281 is performed by an address counter 286 which has a count incremented in response to an image clock signal SYNCK and carries out initialization in response to a horizontal synchronizing signal TG defining the one-line period. The image clock signal SYNCK is a signal serving as a reference for timing of transmission of image data between the above described image processing circuits.

When electric power is supplied to the image reader portion IR, the exposure lamp 17 is turned on in the wait position of the slider 14 and the reference white paint 16 of uniform density provided in an end portion of the glass platen is read. At the same time, the write control enable signal $\overline{\text{SHWR}}$ supplied from the CPU 112 becomes active (active low) and the read reference image data SRD for one line is stored successively for one pixel from the first address of the RAM281 in the order of the arrangement of the pixels. Thus, preparation for supplying the image signal, namely, preparation for shading correction is completed.

When reading of the original D is started, the enable signal $\overline{\text{SHWR}}$ becomes non-active and instead the shading correction enable signal $\overline{\text{SHON}}$ becomes active, so that the reference image data SRD is read successively from the first address of the RAM 281 in synchronization with the input of the image data RD37 to 30 from the preceding stage in response to the signal SYNCK.

In A/D conversion in the above described digitizing processing circuit 101, the maximum value of the photoelectric conversion signal from the element 12 is adjusted to be "255" (11111111 B), the reference image data SRD obtained by reading the reference white image are all "255" theoretically but in reality there are some data smaller than "254" due to light distribution of the exposure lamp, the spectral sensitivity of the elements 12 etc., causing differences in the pixels.

Therefore, according to the present embodiment, in order to compensate for the differences in the pixels and to uniform the data for one line, respective inverse data ID for all possible values of the reference image data SRD are prepared in advance in the inverse conversion ROM 282. The inverse conversion ROM 282 has a capacity of 256 bytes and an address is designated by the reference image data SRD read from the RAM 281, whereby inverse data ID of the designated address is read out.

Inverse data ID of eight bits corresponds to decimal numbers "1" (1000 0000B) to "255/128" (1111, 1111B) out of decimal numbers "0" to "255/128" expressed by steps of "1/128($2^{-7}$)" which can be displayed by a sum of numerical values assigned to the respective bits.

More specifically, if the reference image data SRD is "255", the inverse data ID is "255/255"="1"; if the data SRD is "200", the data ID is "255/200"; and if the data SRD is "128", it is "255/128". Thus, with respect to the reference image data SRD of "128" to "255", inverse values corresponding thereto are obtained by conversion of the maximum data "255" to "1" and with respect to the reference image data smaller than "127", inverse data "255/128" equivalent to "128" corresponds thereto.

In the multiplying device 283, the image data RD37 to 30 read by the same element 12 is multiplied by the inverse data ID corresponding to the reference image data SRD. The image data RD37 to 30 read by the element 12, with reference image data SRD being larger than "128" at the time of reading the reference white paint 16, is multiplied b the inverse data ID and shading correction is applied to the data, whereby the data thus obtained are outputted as correction image data SHD7 or 0 from the shading correction portion SH. For example, if the image data RD37 to 30 read by the element 12 with the reference image data SRD "200" is "150", multiplication of "150"×"255/200" is performed and as a result the data is corrected to "204".

As for the pixels having the reference image data SRD smaller than "127" at the time of reading the reference white paint 16, the data are uniformly multiplied by about 2 and the results are outputted.

The correction image data SHD7 to 0 thus outputted are used as addresses of the density conversion ROM 280 and they are applied to the density conversion ROM 280 as density conversion table index addresses. Logarithm conversion data corresponding to the correction image data SHD7 to 0 are read from the density conversion ROM 280 and they are transmitted as image data RD47 to 40 proportional to the density of the original D to the color correction circuit 105 of the succeeding stage.

Figure 19:
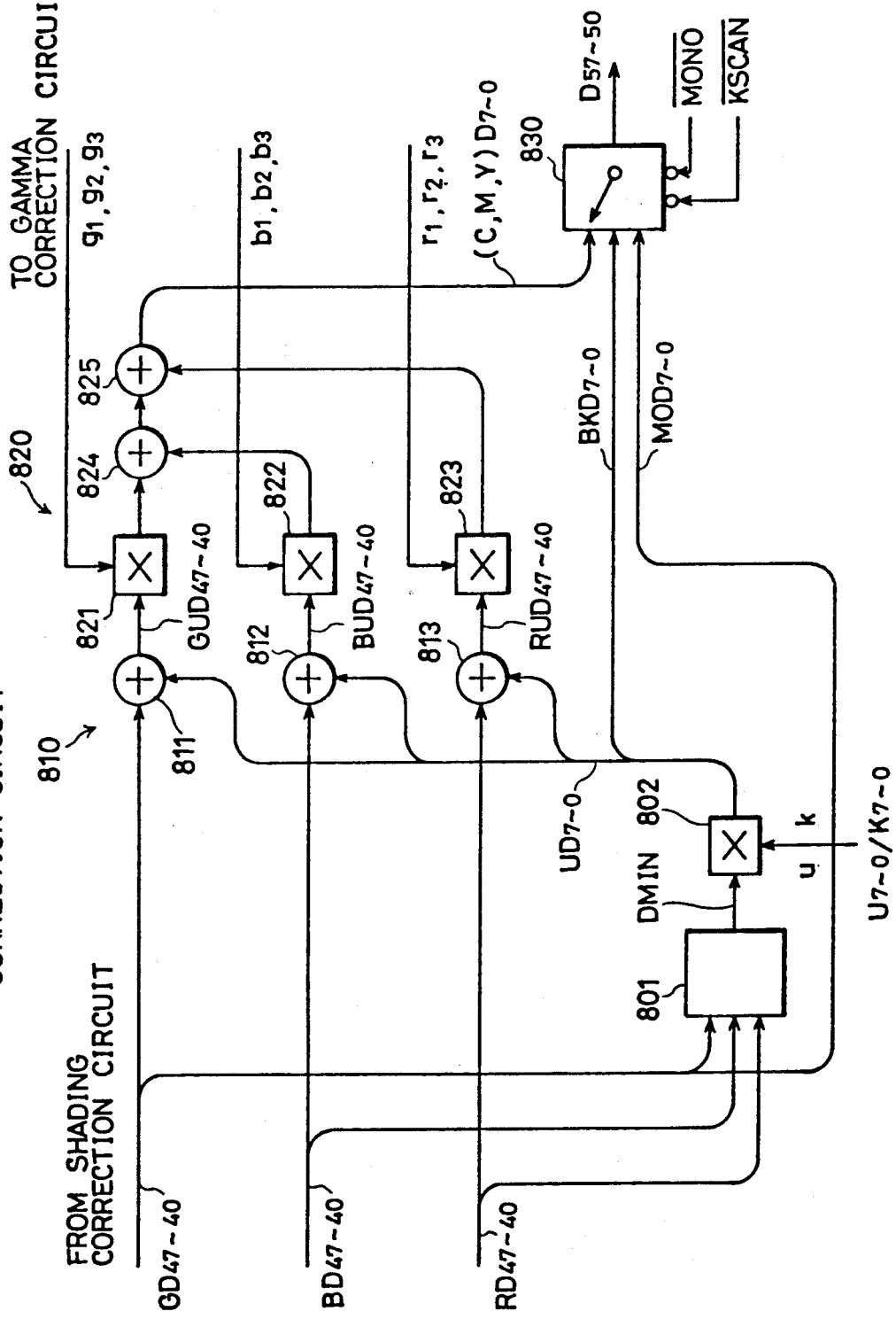
FIG. 19 is a block diagram of a color correction circuit according to the embodiment of the invention.

FIG. 19 is a block diagram of the color correction circuit 105. The color correction circuit 105 comprises: a minimum value detector 801 for selecting the minimum value (minimum image data DMIN) out of the additive color image data (R, G, B) D47 to 40 inputted from the preceding stage; a multiplying device 802 for multiplying the UCR coefficient data U7 to 0 or the BP coefficient data K7 to 0 by the minimum image data DMIN; an UCR calculator 810 including three adders 811 to 813 provided for the respective additive colors; a color correction masking portion 820 including three multiplying devices 821 to 823 to which the outputs of the adders 811 to 813 are directly inputted, and two adders 824, 925 connected to obtain a total arithmetic sum of the respective outputs of the multiplying devices 821 to 823; and an outputs selector 830 which selects any of the output of the adder 825, the output of the multiplying device 802 and the G image data GD47 to 40. The color correction circuit 105 applies BP processing, UCR processing and color correction masking processing to additive color image data (R, G, B) D47 to 40 and outputs image data D57 to 50 for controlling an amount of adhesion of toner of each color used for image formation.

In the BP processing, BP coefficient data K7 to 0 of the value "k" rendered optimum in advance is supplied as a multiplier from the CPU 112 to the multiplying device 802 and data "k×min" obtained by multiplying the minimum image data DMIN (the value thereof being "min") by the value "k" is inputted as black paint image data BkD7 to 0 corresponding to the toner of Bk to the output selector 830.

In the UCR processing, UCR coefficient data U7 to 0 of a value "−u" rendered optimum is supplied as a multiplier to the multiplying device 802 and undercolor image data UD7 to 0 of "−u×min" obtained is applied in common to the respective adders 811 to 813 of the UCR calculator 810. In the respective adders 811 to 813, addition of the additive color image data (R, G, B) D47 to 40 and the under-color image data UD7 to 0 is performed and under-color removal image data GUD47 to 40, BUD47 to 40, RUD47 to 40 are produced by subtraction of the optimum UCR amount "u×min" from the image data (R, G, B) D47 to 40 of the respective additive colors.

The color correction masking portion 820 performs matrix calculation shown by the below indicated equation (2).

$$\begin{pmatrix} C \\ M \\ Y \end{pmatrix} = \begin{pmatrix} g_1 b_1 r_1 \\ g_2 b_2 r_2 \\ g_3 b_3 r_3 \end{pmatrix} \begin{pmatrix} Gu \\ Bu \\ Ru \end{pmatrix} \quad (2)$$

where C, M, Y are image data (C, M, Y) D7 to 0 of the subtractive colors and Gr, Bu, Ru are under-color removal image data (G, B, R) UD47 to 40 of the additive colors. gj, bj, rj (j=1, 2, 3) are optimum primary masking coefficient data obtained by experiments and those data are applied to the multiplying devices 821 to 823 as multiplier according to operation of the laser printer portion LP.

For example, in the case of producing data CD7 to 0 for adhering operation of the toner of C (cyan), undercolor removal image data Gr, Bu, Ru of the subtractive color system are composited as shown by the below equation (3).

$$CD7-0 = g_1 Gu + b_1 Bu + r_1 Ru \ldots \quad (3)$$

As described previously, since the digital copying apparatus A of the present embodiment does not have an image memory of a capacity for storing the data of all the pixels of the original D, reading and scanning operations for one original D are performed four times at the maximum and the toners of C, M, Y, Bk are overlapped in this order, whereby a color image is formed.

Thus, the output selector 830 selects any of the image data GD47 to 40, i.e., the subtractive color image data (C, M, Y) D7 to 0, the black paint image data BkD7 to 0, and the monocolor image data MOD7 to 0 and outputs the data as the image data D57 to 50 to the succeeding stage. More specifically, if a monocolor selection signal $\overline{MONO}$ for designating a monocolor image formation area is active (active low), the monocolor image data MOD7 to 0 is selected; if the signal $\overline{MONO}$ is non-active and a black paint signal $\overline{KSCAN}$ is at "L", the black paint image data BKD7 to 0 is selected; if the signal $\overline{MONO}$ is non-active and the black paint signal $\overline{KSCAN}$ is at "H", the subtractive image color data (C, M, Y) D7 to 0 is selected.

According to the present embodiment, the multiplication using as the multiplicand the minimum image data DMIN in the UCR processing and the BP processing is performed only by one multiplying device 802 and thus the circuit configuration is simplified. Switching between the UCR processing and the BP processing for the multiplying device 802 is effected simultaneously with the switching of the output selector 830.

In addition, the image data GD47 to 40 of G (green) having a high visual sensitivity used as the monocolor image data MOD7 to 0, whereby a natural monocolor image suited for the relative visual sensitivity characteristics can be formed.

Figure 20:
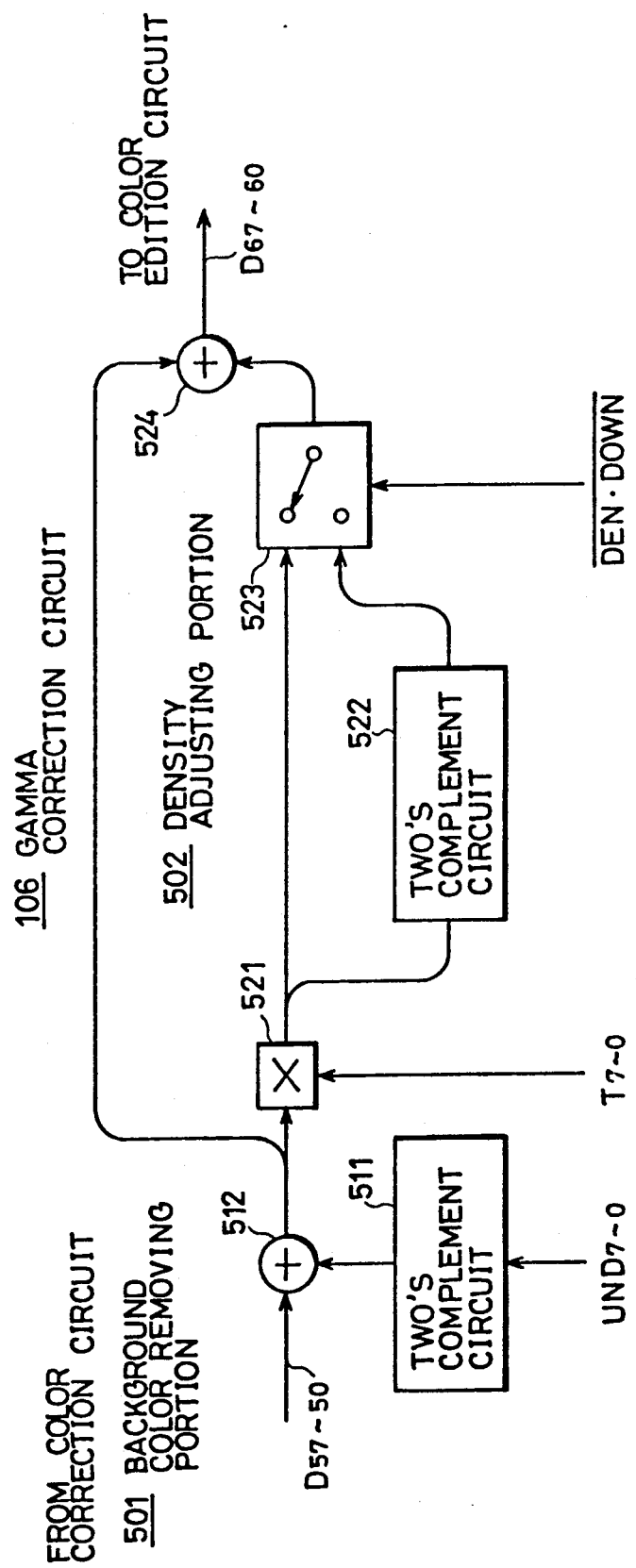
FIG. 20 is a block diagram of a gamma correction circuit according to the embodiment of the invention.
Figure 21A:
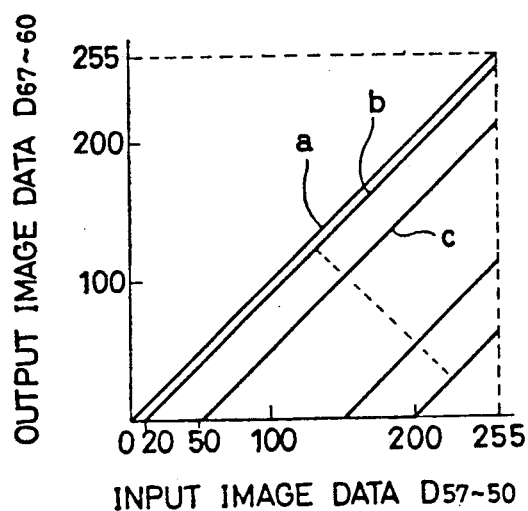
FIGS. 21A to 21C are diagrams showing relations between inputs and outputs of the gamma correction circuit of FIG. 20.
Figure 21C:
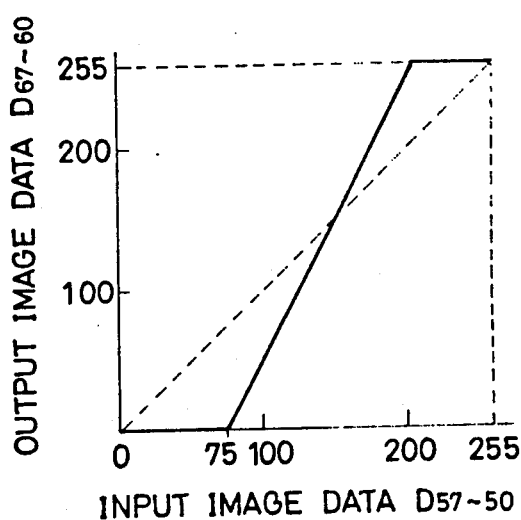
Figure 21B:
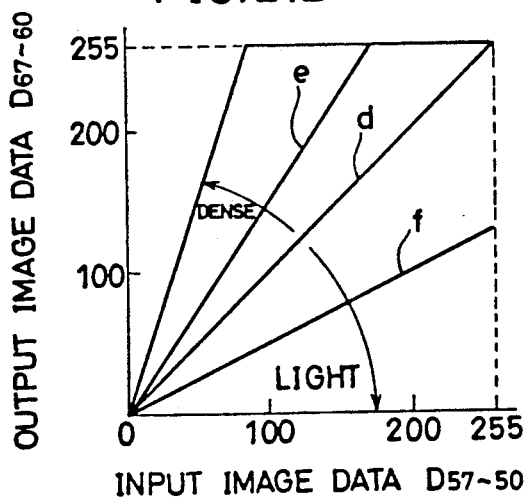

FIG. 20 is a block diagram of the gamma correction circuit 106 and, FIGS. 21A to 21C are diagrams showing input/output relations in the gamma correction circuit 106.

The gamma correction circuit 106 comprises: a density adjuster 502 which increases or decreases respective values of image data based on density coefficient data T7 to 0 to form a hard copy image of a desired density or an optimal density; and a background color removing portion 501 which reduces respective values of image data based on background color data UND7 to 0 to enhance an entire contrast of the formed image.

The density coefficient data T7 to 0 and the background color data UND7 to 0 are set by operation of the density designating keys of the operation panel, not shown, when the copy operation of the digital copying apparatus A is in a manual mode and, when it is in an auto mode selected mainly for copy of a monocolor original, those data are set automatically according to an original density detected by pre-scanning. The density coefficient data T7 to 0 are treated as a positive digital number where the most significant bit and the less significant seven bits of the eight bits are assigned to the first digit of an integer and the first to seventh digits after the decimal point.

The image data D57 to 50 inputted from the color correction circuit 105 is subjected at first to background color removing processing in the background color removing portion 501. For example, in the case of copying, on white copy paper, an original D of a color image printed on yellow paper, in order to form a clear color image, values of the image data D57 to 50 inputted during Y toner adhesion operation in the laser printer portion FP are decreased according to the density of the background color (yellow).

The background color data UND7 to 0 set by the CPU 112 is converted to negative data by the two's-complement circuit 511 of the background color removing portion 501 and the data thus obtained is supplied to the adder 512, where addition of the positive image data D57 to 50 and the negative background color data UND7 to 0 is performed.

As a result, as shown in FIG. 21A, the output data D67 to 60 reduced by the background color data UND7 to 0 with respect to the input image data D57 to 50 is obtained. In FIG. 21A, "a", "b", "c" represent the cases of "0", "20", and "50" of the background color data UD7 to 0, respectively, and in any case the density adjuster 502 does not increase or decrease the data. Thus, the data is not adjusted.

The density adjuster 502 increases and decreases data by arithmetic operation combining multiplication and addition in order to accomplish a multi-step adjustment in a wide range by processing of a limited number of bits (eight bits as for the image data) in the same manner in the white balance correction circuit 103 shown in FIG. 16.

More specifically, the density adjuster 502 comprises: a multiplying device 521 which multiplies the inputted image data D57 to 50 through the background color removing portion 501 by the density coefficient data T7 to 0; a two's complement circuit 522 which converts the output of the multiplying device 521 to negative data; a variable density selector 523 which selects an output of the multiplying device 521 or an output of the two's complement circuit 522 in response to a control signal $\overline{\text{DEN·DOWN}}$; and an adder 524 which adds the inputted image data D57 to 50 and an output of selection of the variable density selector 523, the inputted image data D57 to 50 being adjusted in the density adjuster 502 in the range of magnifications 0 to 3.

In order to form a density image, the enable signal $\overline{\text{DEN·DOWN}}$ is raised to "H" and the variable density selector 523 selects the output of the multiplying device 521. In the case of forming a light image, the enable signal $\overline{\text{DEN·DOWN}}$ falls to "L" and the variable density selector 523 selects the output of the two's complement circuit 522.

Thus, the adder 524 performs addition calculation represented as $Do = Di \pm \gamma Di$ by using the input image data D57 to 50, the density coefficient data GDC7 to 0, and the output image data D67 to 60 as Di, $\gamma$, and Do, respectively, and the density coefficient data T7 to 0 ($\gamma$) is changed, thereby setting in the range shown by the arrow in FIG. 21B, "256" density inclination lines (inclinations of the straight lines in the figure) in the case of increasing density and "128" density inclination lines in the case of decreasing density. Thus density adjustment can be effected substantially in a continuous manner with no steps. In the figure, "D" represents the case of non-adjustment, namely, the case of setting the density coefficient data T7 to 0 as "0", and "e" and "f" both represent the case of setting the data as "0.5" (0100 0000B).

FIG. 21C shows input/output characteristics in the case of applying both the background color removal processing and the density adjustment processing to the image data D57 to 50 inputted from the preceding stage. In the figure, the broken line represents a case of applying no processing and the solid line represents a case of adjustment for increasing the density with the background color data UND7 to 0 being "75" (0100 1011B) and the density coefficient data T7 to 0 being "0.5".

FIG. 22 is a block diagram of a color editing circuit 107.

The color editing circuit 107 comprises: an inverter circuit 601 which produces inversion image data IND67 to 60 by logically inverting the image data D67 to 60 inputted from the gamma correction circuit 106 to form a negative/positive inversion image; a designated color image data generator 602 which outputs designated color image data HD7 to 0 for reproducing a designated color; a negative/positive selector 603 for selecting the image data D67 to 60 or the inverted image data IND67 to 60; a color change selector 604 which selects the selection output of the negative/positive selector 603 or the designated color image data HD7 to 0; and an area paint selector 605 which selects the selection output of the color change selector 604 or the designated color image data HD7 to 0 as image data D77 to 70. In order to output the image data D77 to 70, the selectors 603 to 605 are connected so that color edited image is formed in a preferential order of an area paint (paint-out) image, a color-changed image and a negative/positive inverted image.

The respective selectors 603 to 605 perform selection operation in response to signals $\overline{\text{EDIT1}}$, $\overline{\text{EDIT4}}$, and $\overline{\text{EDIT5}}$ rendered active (active low) at the time of forming an image of an area designated by an editor, not shown, having a sheet-like area scale for designating an area of formation of each color edited image with respect to the original D and a point designation stylus pen.

More specifically, when the respective signals $\overline{\text{EDIT}(1,4,5)}$ are active, the negative/positive selector 603 selects the inverted image data IND67 to 60, and the color change selector 604 and the area paint selector 605 select the designated color image data HD7 to 0, so that a color edited image is formed according to the above described preferential order if the designated areas overlap. The signal $\overline{\text{EDIT4}}$ is applied to the color change selector 604 through a gate circuit 632 controlled by a color designation signal CJ to be described later.

If all the signals $\overline{\text{EDIT}(1,4,5)}$ are non-active, the color editing circuit 107 is in a through state. More specifically, the inputted image data D67 to 60 are transmitted as the image data T77 to 70 to the succeeding stage without being subjected to any processing.

The designated color image data generator 602 comprises: a color generator 621 which generates color data signals 1D7 to 0, 2D7 to 10, 3D7 to 0, 4D7 to 0 for four colors at maximum to reproduce a color designated by the operator; and a selector 622 which selects one of the color data signals (1 to 4) D7 to 0 in response to signals EDIT2, 3 corresponding to the designated color of the color change image or the area paint image and outputs the selected color data signal as designated color image data HD7 to 0. Before a start of scanning of the original D, calculation information corresponding to the designated color is supplied from the ROM 113 through the CPU 112 to the color generator 621.

In the case of forming a color-changed image, for example, in the case of changing a brown portion to a blue portion, calculation information corresponding to the blue color as the designated color (changed color) is supplied to the color generator 621 and at the same time the RGB decomposition data of brown color (to be changed) stored in advance in the ROM 113 is stored in a color determination RAM 631.

Address designation at the time of reading data from the color determination RAM 631 is carried out by the three additive color image data (G, B, R)D47 to 40 outputted from the above mentioned shading correction circuit 104 and the one-bit data (color determination signal CJ) read is "0" ("L") only when the ratio of those image data (G, B, R) D47 to 40 is a value corresponding to the brown color to be changed.

Accordingly, when the color of the pixel subjected to processing is the brown color designated as the color to be changed, the output of the gate circuit 632 becomes "L" (active) if the signal $\overline{\text{EDIT4}}$ is "L", and the color change selector 604 selects the designated color image data HD7 to 0 of blue color.

In the above described embodiment, the gamma correction circuit 106 and the color editing circuit 107 are independent components and those circuits are provided in the order of the gamma correction circuit 106 and the color editing circuit 107 according to the transmission order of image data. Consequently, it is possible to perform processing for forming a color-changed image or an area paint image without being affected by the density correction.

Figure 23:
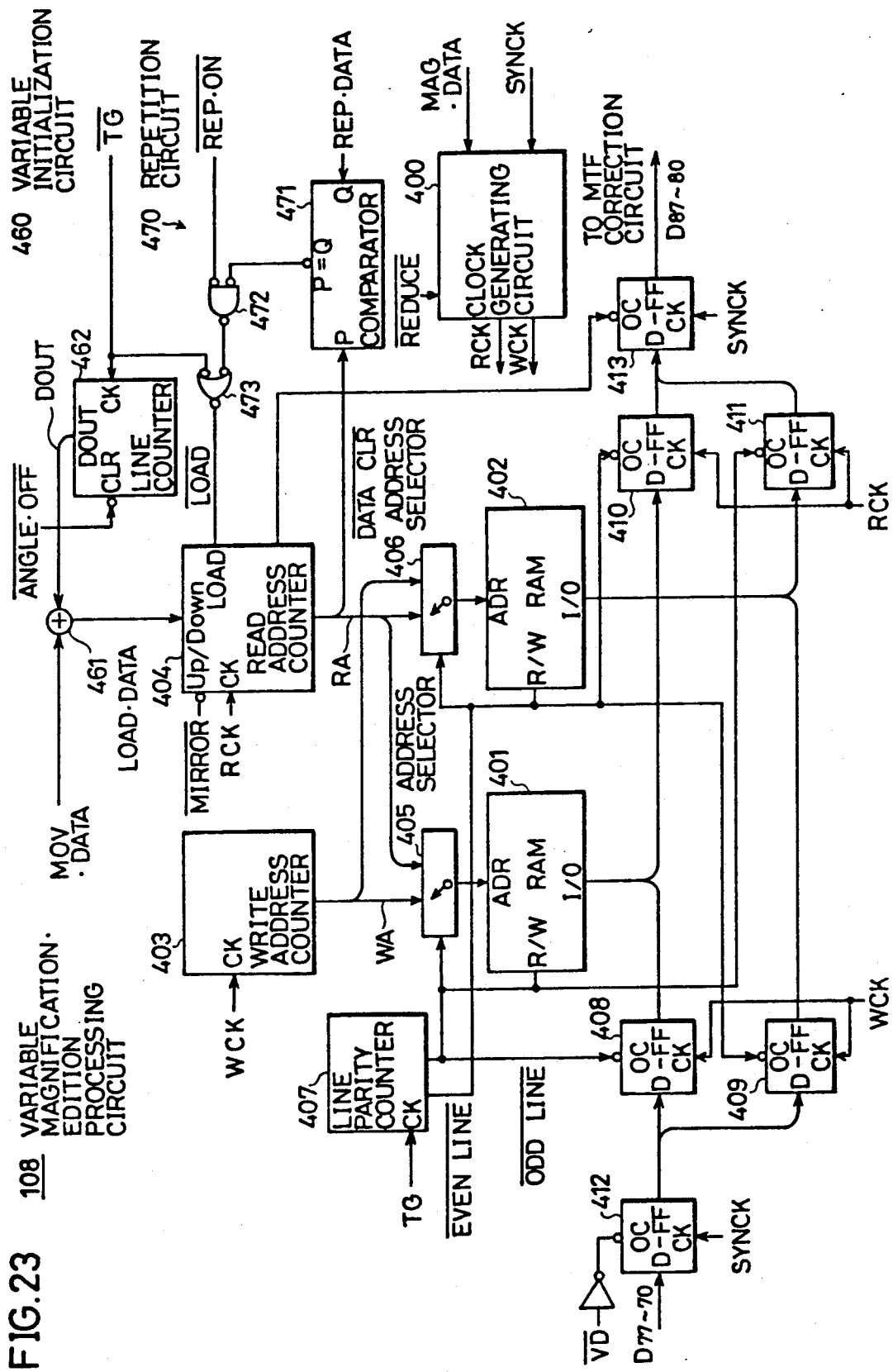
FIG. 23 is block diagram of a variable magnification edition processing circuit according to the embodiment of the invention.

FIG. 23 is a block diagram of the variable magnification edition processing circuit 108.

The variable magnification edition processing circuit 108 applies magnification changing processing and edition processing related with positions or manners of image formation to the image data signal D77 to 70 inputted from the color edition circuit 107 of the preceding stage and provides an image data signal D87 to 80 to an MTF correction circuit 109 of the succeeding stage. The input and output of data are effected through latch circuits 412, 413 which carry out latch operation in response to an image clock signal SYNCK serving as a reference of image data transmission timing in the above mentioned respective image processing circuits.

The variable magnification edition processing circuit 108 comprises: a clock generating circuit 400 which generates a variable magnification clock signal obtained by subtraction of the signal SYNCK and outputs a write clock signal WCK and a read clock signal RCK in parallel; a pair of RAMs 401, 402 which write successively inputted image data alternately by a prescribed amount for each one-line period and one of which reads the written image data while the other writes the image data; a write address counter 403 which designates an address in writing operation of the RAMs 401, 402 in response to the write clock signal WCK; a read address counter 404 which designate an address in reading operation of the RAMs 401, 402 in response to the read clock signal RCK; address selectors 405, 406 which select a write address WA provided from the write address counter 403 and a read address RA provided from the read address counter 404; and a line parity counter 407 which selects the writing operation or the reading operation of the RAMs 401, 402.

Each of the RAMs 401, 402 has a capacity of 8 K bytes and it is capable of storing image data for one line (8000 pixels) in the main scanning direction.

The write address counter 403 increments, namely, counts upward a count by "1" for one line from a fixed count initial value in response to the signal WCK. The read address counter 404 performs counting operation which can be controlled by various edition processing signals as described afterwards.

The line parity counter 407 outputs an odd line signal $\overline{\text{ODD·LINE}}$, alternately changing to "L" and "H" each time it counts a horizontal synchronizing signal TG defining the one-line period, and an even line signal $\overline{\text{EVEN·LINE}}$ corresponding to an inversion signal of the odd line signal $\overline{\text{ODD·LINE}}$, and it selects the writing operation or the reading operation of the RAMs 401, 402.

The clock generating circuit 400 is controlled by a variable magnification control enable signal $\overline{\text{REDUCE}}$. In the case of forming a reduced image, it outputs a write clock signal WCK as a variable magnification clock signal and a read clock signal RCK as a reference clock signal SYNCK. In the case of forming an expanded image, the clock generating circuit 400 outputs the write clock signal WCK as the signal SYNCK and the read clock signal RCK as the variable magnification clock signal.

Image can be formed with magnification changed in the main scanning direction based on an image data signal D87 to 80 generated by providing different accessing timings in the writing operation and the reading operation of the pair of RAMs 401, 402 in response to the signals WCK and RCK having different numbers of pulses per unit time. The magnification can be changed in the sub scanning direction by changing the moving speed f the slider 14.

The count initial value of the read address counter 404 is set by a load signal LOAD applied from a repetition circuit 470 based on load data LOAD·DATA from an addition circuit 461 to which movement data MOVE·DATA is applied from the CPU 112.

By suitably changing the count initial value, it is possible to form a moved image where a position of image formation is shifted.

More specifically, since each of the RAMs 401, 402 has the capacity of 8 K bytes (8192×8 bits) as described previously, it is possible to assign addresses of "0H" to 1FFFH" (13 bits). On the other hand, the read address counted 404 is a 15-bits counter and it is possible to generate addresses of "0H" to 37 7FFFH". Thus, by assigning "4OOOH" to "5FFFH" to address areas of the RAMs 401, 402 and setting the initial count value of the read address counter 404 to a value increased or decreased from "4OOOH" dependent on the load data LOAD·DATA, it is possible to shift the read position of the RAMs 401, 402 rightward or leftward in the main scanning direction.

The repetition circuit 470 is used to form a repetitive image and it comprises: a comparator 471 which compares an output of the read address counter 404 and repetition data REP·DATA; a gate circuit 472 which receives an output of the comparator 471 and a repetition control enable signal $\overline{\text{REP·ON}}$; and a gate circuit 473 which receives an output of the gate circuit 472 and a horizontal synchronization enable signal $\overline{\text{TG}}$.

If the signal $\overline{\text{REP·ON}}$ is active, the output of the comperator 471 is "L" (active) when the count value attains the repetition data REP·DATA. As a result, the signal $\overline{\text{LOAD}}$ is rendered active and initialization is effected to load the load data LOAD·DATA in the read address counter 404. Thus, even if data for one line is being read from the RAM 401 or 402, the address counter 404 increments again the initial count value. Thus, the image data stored in the specified address area of the RAM 401 or 402 is repeatedly read, whereby a repetition image data signal is generated. The repetition image processing is suited for example for preparation of a large number of labels.

A various initialization circuit 460 is used to form an oblique image and it comprises the above mentioned adder 461 and line counter 462. At the time of forming an oblique image, the initial count value of the read address counter 404 is changed by the variable initialization setting circuit 460 for each predetermined period.

The line counter 462 counts upward in response to a signal $\overline{\text{TG}}$ when an oblique enable signal $\overline{\text{ANGLE·OFF}}$ is active. The adder 461 outputs load data $\overline{\text{LOAD·DATA}}$ obtained by addition of the output DOUT of the line counter 462 to the movement data MOV·DATA. Accordingly, the initial count value of the read address counter 444 increases for one line. Thus, the image formed is an oblique image obtained by leftward shifting one pixel for each line.

The read address counter 404 is capable of selecting upward counting operation or downward counting operation in response to a mirror enable signal $\overline{\text{MIRROR}}$.

When the signal $\overline{\text{MIRROR}}$ is non-active, the read address counter 404 performs upward counting operation in response to a signal RCK from the initial count value set based on the load data LOAD-DATA as described above. When the signal $\overline{\text{MIRROR}}$ is active, the operation is changed to downward counting operation.

When the read address counter 404 is switched to downward counting operation, the image data written in the RAM 401 or 402 is read successively in the order starting with the latest written data. For example, if "5000H" is set as the initial count value based on the load data LOAD-DATA, the read address counter 404 decrements the count value staring from the logical address "5000H" and the image data stored in an address range M from a physical address corresponding to the logical address "5000H" to the physical address "0" is read from the RAMs 401, 402.

The image formed based on the image data signal D87 to 80 thus generated by the downward counting operation of the read address counter 404 is a mirror image where the original image is inverted symmetrically with respect to the vertical center line. This mirror image is utilized for example for preparation of a print.

Figure 24:
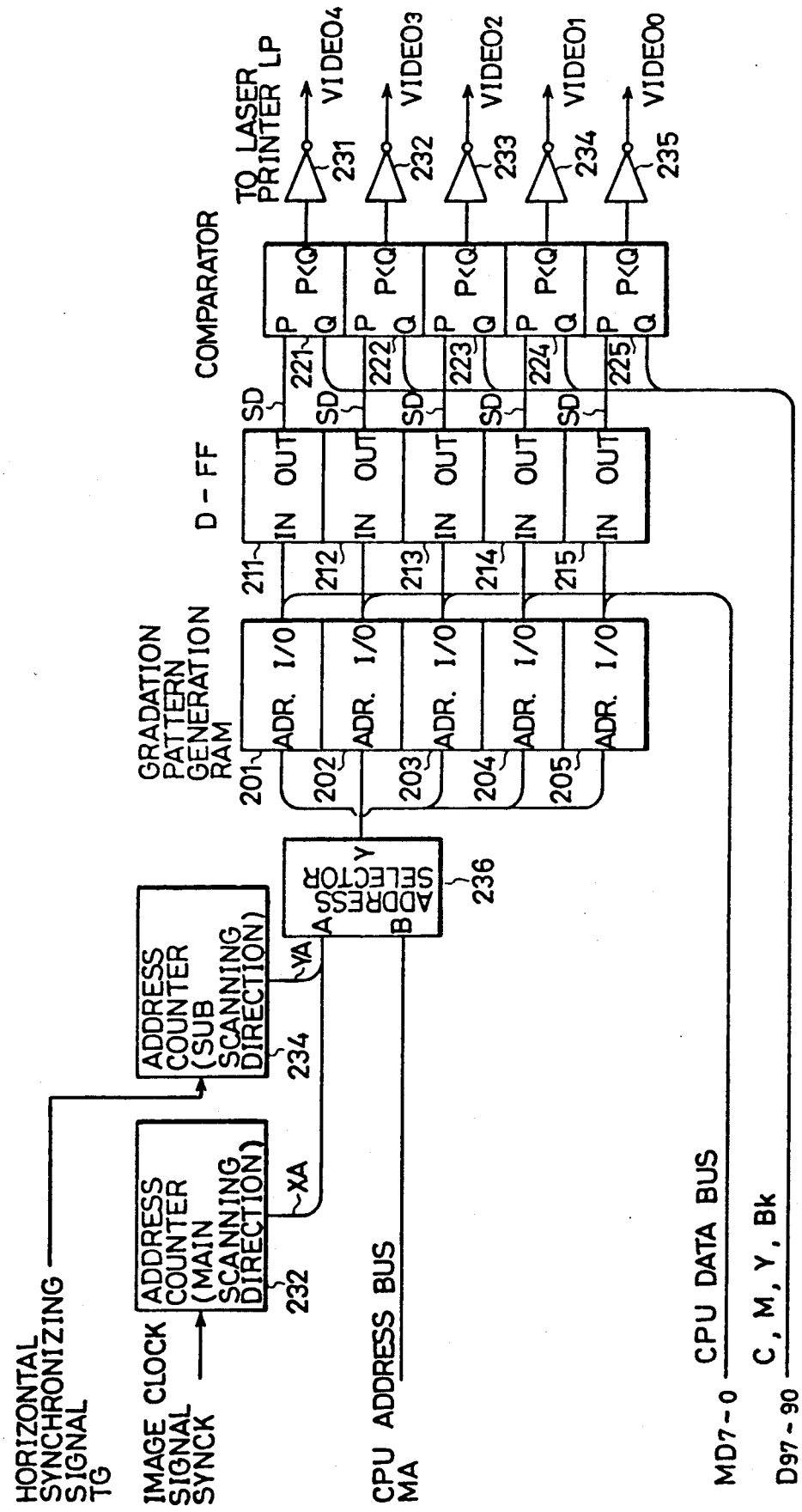
FIG. 24 is a block diagram of a gradation reproducing circuit according to the embodiment of the invention.
Figure 25:
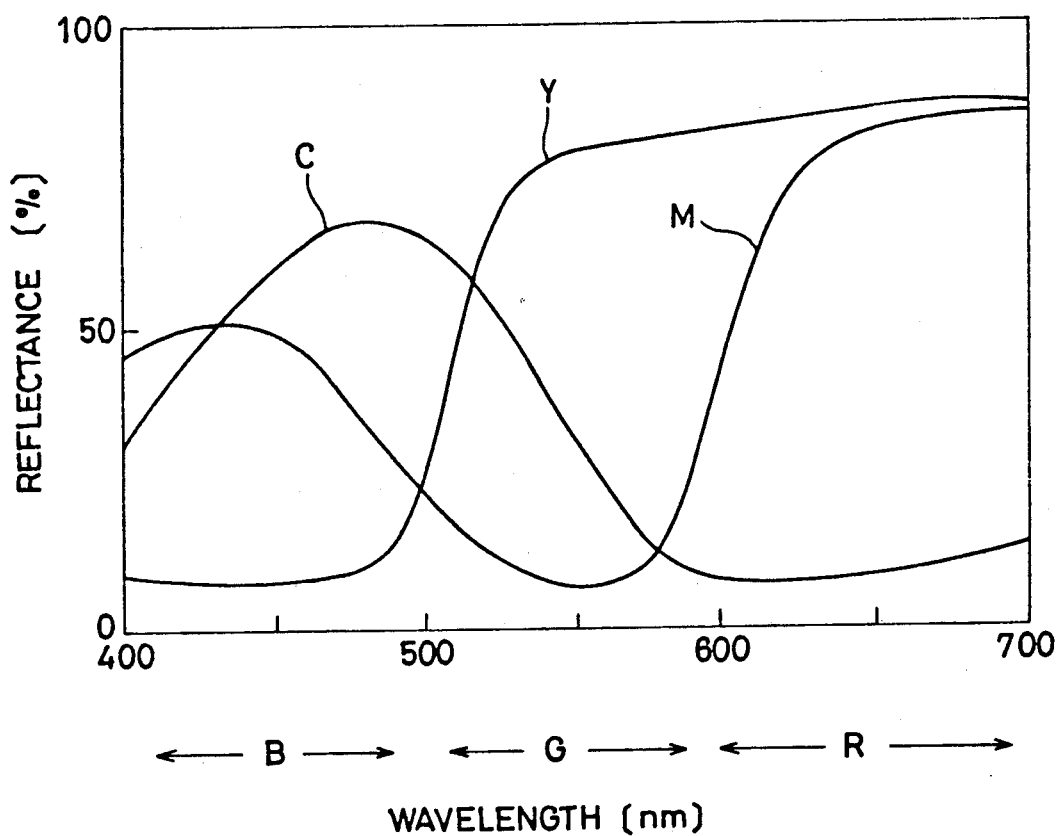
FIG. 25 is a graph showing general spectral characteristics of yellow, cyan and magenta toners used in color image formation in a general electrophotographic process.
Figure 26:
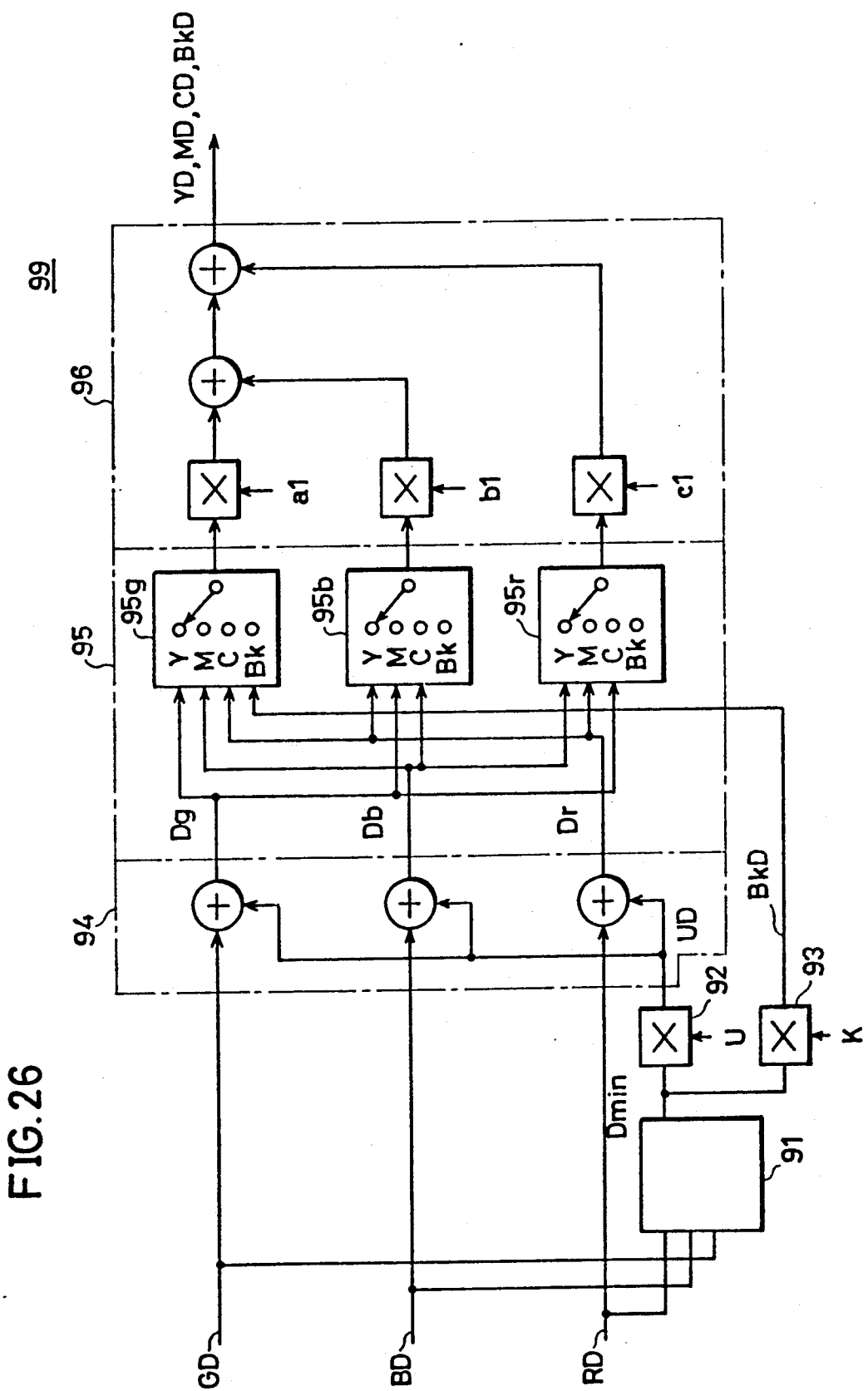
FIG. 26 is a block diagram of a color correction circuit included in a conventional image reading apparatus.

FIG. 24 is a block diagram of the gradation reproducing circuit 110.

The gradation reproducing circuit 110 compares 256-gradation image data D97 to 90 with threshold value data SD (eight bits) read from the ROM 113 and outputs binary data for defining an arrangement of display dots and non-display dots of an image to be formed. This circuit 110 comprises: gradation pattern generating RAMs 201 to 205 for temporarily storing the threshold value data SD; latch circuits 211 to 215 for latching the threshold data SD read from the RAMs 201 to 205 to attain synchronization with the image data D97 to 90; five comperators 221 to 225 for comparing the threshold value data SD from the latch circuits 211 to 215 with the image data D97 to 90 and outputting an image signal obtained by rendering the image data D97 to 90 binary; address counters 232 and 234 for generating addresses to read the threshold value data SD from the RAMs 201 to 205; and an address selector 236 for selecting address buses XA and YA for reading from the address counters 232, 234 and an address bus MA for writing from the CPU 112.

The RAMs 201 to 205 store groups of threshold value data SD for two types of gradation matrix patterns corresponding to image formation of eight gradations suited for copy of letter image and 29 gradations suited for photographic image. The threshold value data SD are transferred from the ROM 113 before a start of scanning the original D.

When the threshold value data SD are to be read from the RAMs 201 to 205, the address selector 236 selects the addresses buses XA and YA for reading from the address counters 232, 234 and assigns those buses for the significant and less significant bits, whereby the data are outputted to the address terminals of the RAMs 201 to 205.

One address counter 232 counts upward in response to input of the image clock signal SYNCK defining transfer timing of the image data D97 to 90 for one pixel while the other address counter 234 counts upward in response to the horizontal synchronizing signal TG as a reference of an image formation period for one line in the main scanning direction.

The threshold value data SD stored in the RAMs 201 to 205 are successively read in synchronization with the signal SYNCK and the five threshold value data SD thus read are supplied to the latch circuits 211 to 215, where the transfer timing of those data is adjusted. Then, those threshold value data SD are compared simultaneously with the image data D97 to 90 for one pixel supplied in common to the comparators 211 to 215 through the image data D97-90 bus.

Thus, the image data D97 to 90 are rendered binary based on the threshold value data SD and five binary data for one pixel are outputted simultaneously from the comparators 211 to 215. Those binary signals are inverted in the inverters 231 to 235 and then the signals are transmitted to the laser printer portion LP as image signals VIDE04 to 0 with reproduced gradations.

The laser printer portion LP converts the parallel input image signals VIDE04 to 0 to serial signals and controls turn-on of the laser light source in response to the image signal VIDE04 to 0, and forms a color hard copy image where five dots are assigned to one pixel of the original D.

According to the present invention, under-color image data and black paint image data are produced by one multiplying means in a time-sharing manner and subtractive color image data is produced by applying the under-color removal image data produced by the under-color removal calculating means directly to the color correction masking means, not through selection means. Consequently, in integration of components, the area occupied by the components can be reduced compared with a conventional color correction circuit by an area corresponding to one multiplying means and two selection means. Thus, the image processing apparatus according to the present invention can be made small-sized.

The foregoing and other objects, features, aspects and advantages of the present invention will become more apparent from the following detailed description of the present invention when taken in conjunction with the accompanying drawings.

What is claimed is:

1. An image processing apparatus for reading an original image by dividing the original image into pixels, processing respective image data obtained by the reading and outputting an image signal corresponding to each pixel, comprising:
   selecting means for selecting minimum image data from three image data which respectively correspond to additive three primary colors obtained by reading a color image;
   multiplying means for multiplying said minimum image data by either under-color removal coefficient data or black paint coefficient data supplied thereto and outputting under-color image data or black paint image data;
   under-color removal calculating means for receiving said three image data and the image data outputted from said multiplying means, and generating under-color removal image data corresponding to said three image data based on the under-color image data;
   color correction masking means for receiving the under-color removal image data from said under-color removal calculating means and generating image data of subtractive colors based on masking coefficient data corresponding to the respective additive colors; and image data selecting means constructed to receive the image data outputted from said multiplying means and the image data outputted from said color correction masking means, for selectively outputting the image data of the subtractive colors outputted from said color correction masking means when the under-color removal coefficient data is supplied to said multiplying means, and the black paint image data outputted from said multiplying means when the black paint coefficient data is supplied to said multiplying means.

2. An image processing apparatus for reading an original image by dividing the original image into pixels, processing respective image data obtained by the reading and outputting an image signal corresponding to each pixel, comprising:

selecting means for selecting minimum image data from three image data which respectively correspond to additive three primary colors obtained by reading a color image;

output means for outputting under-color removal coefficient data or black paint coefficient data;

multiplying means for multiplying the minimum image data by the coefficient data outputted from said output means and outputting under-color image data or black paint image data;

under-color removal calculating means for receiving said three image data and the image data outputted from said multiplying means, and generating under-color removal image data corresponding to said three image data based on the under-color image data;

color correction masking means for receiving the under-color removal image data from said under-color removal calculating means and generating image data of subtractive colors based on masking coefficient data corresponding to the respective additive colors;

image data selecting means constructed to receive the image data outputted from said multiplying means and the image data outputted from said color correction masking means, for selectively outputting one image data of them; and control means for controlling the selective output of said image data selecting means so that the image data of the subtractive colors from said color correction masking means is outputted when the under-color removal coefficient data is outputted from said output means, and that the black paint image data from said multiplying means is outputted when the black paint coefficient data is outputted from said output means.

3. An image processing apparatus for reading an original image by dividing the original image into pixels, processing image data obtained by the reading and outputting an image signal corresponding to each pixel, comprising:

selecting means for selecting minimum image data from three image data which respectively correspond to additive three primary colors obtained by reading a color image;

multiplying means for multiplying said minimum image data by either under-color removal coefficient data or black paint coefficient data supplied thereto and outputting under-color image data or black paint image data;

under-color removal calculating means for receiving said three image data and the image data outputted from said multiplying means, and generating under-color removal image data corresponding to said three image data based on the under-color image data;

color correction masking means for receiving the under-color removal image data from said under-color removal calculating means and generating image data of subtractive colors based on masking coefficient data according to the respective additive colors; and image data selecting means constructed to receive the image data outputted from said multiplying means, the image data outputted from said color correction masking means and one of the image data of the additive three primary colors, for selectively outputting one image data of them.

4. An image processing apparatus in accordance with claim 3, wherein one of the image data of the additive three primary colors is image data corresponding to additive green color.

5. An image processing apparatus for reading an original image by dividing the original image into pixels, processing respective image data obtained by the reading, and outputting an image signal corresponding to each pixel, comprising:

multiplying means for multiplying density coefficient data designated for each original image by the image data, thereby outputting correction data; and density correction calculating means for adding the correction data outputted from said multiplying means and the image data, thereby outputting density correction image data.

6. An image processing apparatus for reading an original image by dividing the original image into pixels, processing respective image data obtained by the reading, and outputting an image signal corresponding to each pixel, comprising:

subtracting means for subtracting image data based on background color data designated for each original image;

multiplying means for multiplying the image data obtained by the subtraction of said subtracting means by density coefficient data designated for each original image, thereby outputting correction data; and density correction calculating means for adding the correction data outputted form said multiplying means and the image data, thereby outputting density correction image data.

7. An image processing apparatus for reading an original image by dividing the original image into pixels, processing respective image data obtained by the reading, and outputting an image signal corresponding to each pixel, comprising:

color correction means for generating image data corresponding to subtractive three primary colors based on image data of additive three primary colors obtained by reading the original image;

density correction means for correcting the image data corresponding to the subtractive three primary colors according to a density designated, and generating density correction image data; and color editing means for converting the density correction image data generated by said density correction means to designated color image data.

8. An image data processing method in an apparatus for reading an original image by dividing the original image into pixels, processing respective image data obtained by the reading, and outputting an image signal corresponding to each pixel, comprising the steps of:

generating image data corresponding to subtractive three primary colors based on image data of additive three primary colors obtained by reading the original image;

correcting the generated image data corresponding to the subtractive three primary colors to a designated density; and converting the corrected image data to image data corresponding to a designated color.

* * * * *